(12) United States Patent
Lee et al.

(10) Patent No.: US 10,863,423 B2
(45) Date of Patent: Dec. 8, 2020

(54) WIRELESS COMMUNICATION APPARATUS FOR MANAGING ACCESS TO PLURALITY OF WIRELESS NETWORKS AND MANAGEMENT METHOD THEREOF

(71) Applicant: Samsung Electronics Co., Ltd., Gyeonggi-do (KR)

(72) Inventors: Jun-kyoung Lee, Yongin-si (KR); Kang-gyu Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 167 days.

(21) Appl. No.: 15/888,514

(22) Filed: Feb. 5, 2018

(65) Prior Publication Data
US 2019/0069224 A1 Feb. 28, 2019

(30) Foreign Application Priority Data
Aug. 23, 2017 (KR) .................. 10-2017-0106646

(51) Int. Cl.
*H04W 48/16* (2009.01)
*H04L 29/06* (2006.01)
*H04W 48/18* (2009.01)
*H04W 88/06* (2009.01)

(52) U.S. Cl.
CPC ......... *H04W 48/16* (2013.01); *H04L 65/1016* (2013.01); *H04L 65/1073* (2013.01);
(Continued)

(58) Field of Classification Search
CPC ..... H04W 48/16; H04W 48/18; H04W 88/06; H04W 68/02; H04W 76/02; H04W 72/00; H04W 48/14; H04W 4/14; H04W 72/04; H04W 36/14; H04W 80/04; H04W 8/20; H04W 52/02; H04W 48/08; H04W 8/205; H04W 12/06; H04W 15/77; H04W 4/50; H04W 4/24; H04W 12/0806; H04W 24/04; H04W 8/265; H04W 8/04; H04W 8/10; H04W 8/183; H04W 4/60; H04W 60/00; H04W 72/08; H04W 40/12; H04W 72/085; H04W 16/14; H04W 72/044; H04W 72/0446; H04W 12/08; H04W 24/10; H04W 4/02; H04W 4/025; H04W 76/10;
(Continued)

(56) References Cited

U.S. PATENT DOCUMENTS 8,743,887 B2 6/2014 Balasubramanian et al.
9,083,713 B2 7/2015 Mahendran et al.
(Continued)

*Primary Examiner* — Hardikkumar D Patel
(74) *Attorney, Agent, or Firm* — Harness, Dickey & Pierce, P.L.C.

(57) ABSTRACT

A method of managing access to a plurality of Packet Switched (PS) networks of a wireless communication apparatus including a plurality of Subscriber Identity Modules (SIMs) includes obtaining first information indicating data service-related preferences for the plurality of SIMs, selecting at least one SIM necessary for accessing each of the plurality of PS networks from among the plurality of SIMs, based on the first information and second information indicating a wireless network capable of being provided by an operator corresponding to each of the plurality of SIMs, and accessing each of the plurality of PS networks by using the selected at least one SIM.

17 Claims, 24 Drawing Sheets

(52) U.S. Cl.
CPC .............. *H04L 69/18* (2013.01); *H04W 48/18* (2013.01); *H04W 88/06* (2013.01)

(58) Field of Classification Search
CPC ..... H04W 4/029; H04W 76/16; H04W 76/15; H04W 72/1205; H04W 4/16; H04W 72/1215; H04W 8/24; H04L 65/1016; H04L 65/1073; H04L 69/18; H04L 29/06; H04L 12/24; H04L 41/0806; H04L 63/0428; H04L 63/0853; H04L 5/006; H04L 12/58; H04L 12/947; H04L 9/3263; H04L 9/3242; H04L 49/252; H04L 12/28; H04L 5/14; H04B 1/3816; H04B 1/38; H04B 1/33; H04M 15/77; H04M 15/28; H04M 15/72; H04M 15/75; H04M 15/7556; H04M 15/80; H04M 15/8038; H04M 15/8083; H04M 15/70; H04M 15/725; H04M 15/07; H04M 15/715; H04M 1/673

See application file for complete search history.

(56) References Cited

U.S. PATENT DOCUMENTS

| | | |
|---|---|---|
| 9,161,302 B2 | 10/2015 | Belghoul |
| 9,313,709 B2 | 4/2016 | Cheng et al. |
| 9,674,750 B2 | 6/2017 | Keller et al. |
| 9,674,758 B2 | 6/2017 | Tsai et al. |
| 9,681,452 B2 | 6/2017 | Chuttani et al. |
| 2015/0289224 A1 | 10/2015 | Kabadi et al. |
| 2015/0312717 A1* | 10/2015 | Shih ...................... H04W 64/00 455/456.1 |
| 2015/0327207 A1 | 11/2015 | Bharadwaj |
| 2015/0365216 A1 | 12/2015 | Chen et al. |
| 2016/0127422 A1* | 5/2016 | Basavarajappa ...... H04W 76/11 455/426.1 |
| 2016/0142998 A1* | 5/2016 | Tsai ..................... H04B 1/3816 455/458 |
| 2016/0353333 A1 | 12/2016 | Jamadagni et al. |
| 2018/0160422 A1* | 6/2018 | Pathak ................. H04W 76/20 |
| 2018/0176887 A1* | 6/2018 | Strobl ................... H04W 76/40 |

* cited by examiner

FIG. 17C

Ref Table

| PS preferred SIM | CS Network available in SIM1 | CS Network available in SIM2 | Allocation of INT PDN | Allocation of IMS PDN |
|---|---|---|---|---|
| SIM1 | Y | Y | SIM1 | SIM1 |
| | N | Y | SIM1 | SIM1 |
| | Y | N | SIM1 | SIM2 |
| | N | N | SIM1 | SIM1 |
| SIM2 | Y | Y | SIM2 | SIM2 |
| | N | Y | SIM2 | SIM1 |
| | Y | N | SIM2 | SIM2 |
| | N | N | SIM2 | SIM2 |

WIRELESS COMMUNICATION APPARATUS FOR MANAGING ACCESS TO PLURALITY OF WIRELESS NETWORKS AND MANAGEMENT METHOD THEREOF

CROSS-REFERENCE TO RELATED APPLICATION

This application claims the benefit of Korean Patent Application No. 10-2017-0106646, filed on Aug. 23, 2017, in the Korean Intellectual Property Office, the disclosure of which is incorporated herein in its entirety by reference.

BACKGROUND

Example embodiments of the inventive concepts relate to a wireless communication apparatus and/or a method of operating the same. For example, at least some example embodiments relate to a wireless communication apparatus that includes a plurality of Subscriber Identity Modules (SIMs) and manages access to a plurality of wireless networks by using the plurality of SIMs, and/or a management method of the wireless communication apparatus.

Multi-SIM wireless communication apparatuses, such as mobile phones, personal digital assistants, tablets, and laptops, may include two or more SIM cards. Each SIM card may include unique International Mobile Subscriber Identity (IMSI) and key information that allows a user of a wireless communication apparatus to be identified and authenticated by a service provider. A multi-SIM wireless communication apparatus may allow a user to access various wireless networks by using multi-SIMs.

Wireless networks may include a Circuit Switched (CS) network (e.g., a second or third generation network) and a Packet Switched (PS) network (e.g., a fourth generation network). The fourth generation network may include an Internet packet data network and an IP Multimedia Subsystem (IMS) packet data network.

In conventional arts, since only a specific one of the multi-SIMs may support access to the fourth generation network, a wireless communication apparatus may access the Internet packet data network and the IMS packet data network only through the specific SIM. However, current multi-SIMs may allow at least two SIMs to access the fourth generation network, and, thus there may be multiple ones of the SIMs available that support access to the fourth generation network.

SUMMARY

Example embodiments of the inventive concepts provide a wireless communication apparatus for efficiently managing an operation of accessing wireless networks and/or a management method of the wireless communication apparatus.

At least some example embodiments of the inventive concepts relate to a method of managing access to a plurality of Packet Switched (PS) networks by a wireless communication apparatus, the wireless communication apparatus configured to operate using a plurality of Subscriber Identity Modules (SIMs).

In some example embodiments, the method includes obtaining first information indicating data service-related preferences for the plurality of SIMs; selecting at least one selected SIM for accessing each of the plurality of PS networks from among the plurality of SIMs based on the first information and second information, the second information indicating a type of wireless network providable by operators corresponding to the plurality of SIMs; and accessing the plurality of PS networks based on the at least one selected SIM.

At least some other example embodiments of the inventive concepts relate to a wireless communication apparatus.

In some example embodiments, the wireless communication apparatus includes a Subscriber Identity Module (SIM) interface configured to read data from a plurality of Subscriber Identity Modules (SIMs) including a first SIM and a second SIM, the first SIM and the second SIM each capable of supporting a data service and an Internet protocol Multimedia Subsystem (IMS) service; and a processor coupled to the first SIM and the second SIM, the processor configured to, allocate an Internet packet data network to one of a first protocol stack and a second protocol stack based on first information, the first information indicating data service-related preferences for the first SIM and second SIM, the first protocol stack corresponding to the first SIM and the second protocol stack corresponding to the second SIM, and allocate an IMS packet data network to one of the first protocol stack and the second protocol stack based on second information, the second information indicating types of wireless networks providable by a first operator and a second operator, the first operator corresponding to the first SIM and the second operator corresponding to the second SIM.

At least some other example embodiments of the inventive concepts relate to a non-transitory computer-readable recording medium storing therein instructions executable by a processor of a wireless communication apparatus, the wireless communication apparatus configured to operate using a plurality of Subscriber Identity Modules (SIMs) and a transceiver.

In some example embodiments, the instructions are executable to configure the wireless communication apparatus to obtain first information indicating data service-related preferences for the plurality of SIMs; select at least one selected SIM for accessing a plurality of PS networks from among the plurality of SIMs based on the first information and second information, the second information indicating a type of wireless network providable by operators corresponding to the plurality of SIMs; and access, via the transceiver, the plurality of PS networks based on the selected at least one SIM.

BRIEF DESCRIPTION OF THE DRAWINGS

Example embodiments of the inventive concepts will be more clearly understood from the following detailed description taken in conjunction with the accompanying drawings in which:

FIGS. 17A to 17C are diagrams illustrating information that is used during a packet data network allocation operation according to an example embodiment of the inventive concepts is performed.

DETAILED DESCRIPTION

Hereinafter, example embodiments of the inventive concepts will be described in detail with reference to the accompanying drawings.

The term "wireless communication apparatus" may denote at least one of a cellular phone, a smart phone, a personal or mobile multimedia player, a personal digital assistant, a laptop computer, a tablet, a smartbook, a wireless gaming controller, and a personal electronic device including a circuit for transmitting/receiving data over a wireless network, a writable processor, and a memory.

A Subscriber Identity Module (SIM), a SIM card, a Universal Subscriber Identity Module (USIM), an IP Multimedia Services Identity Module (ISIM), and a Universal Integrated Circuit Card (UICC) may be memories that store International Mobile Subscriber Identity (IMSI) and other information used to identify and/or authenticate a wireless communication apparatus on a wireless network, and the memory may be embedded in a detachable card or may be an integrated circuit. Also, since information stored in a SIM makes it possible to establish a communication link so that a wireless communication apparatus may access a particular wireless network, the term "SIM" may be used as an abbreviation for a wireless network associated with a SIM and furthermore, the SIM, the wireless network, and services and subscriptions supported by the SIM may be interrelated.

A multi-SIM wireless communication apparatus, a dual-SIM wireless communication apparatus, a dual-SIM dual active apparatus, a dual-SIM dual standby apparatus may include two or more SIMs and be wireless communication apparatuses capable of managing access to wireless networks by using the SIMs.

A network operator, an operator, a mobile network operator, a carrier, and a service provider may sell and deliver wireless communication services to users and may correspond to wireless communication service providers that provide provisioning and credentials required as policies implemented in subscriptions of a user device.

Wireless networks may be widely deployed to provide various wireless communication services such as voice, video, packet data, broadcasts, and messaging, and these wireless networks may support communication for multiple users by sharing available network resources. The wireless networks may include second and third generation wireless networks, such as a Global System for Mobile Communications (GSM) network and a Code Division Multiplex Access (CDMA) network, fourth generation wireless networks, such as a Long Term Evolution (LTE) network and an LET Advanced (LTE-A) network, and next generation networks, such as fifth generation wireless networks.

Figure 1:
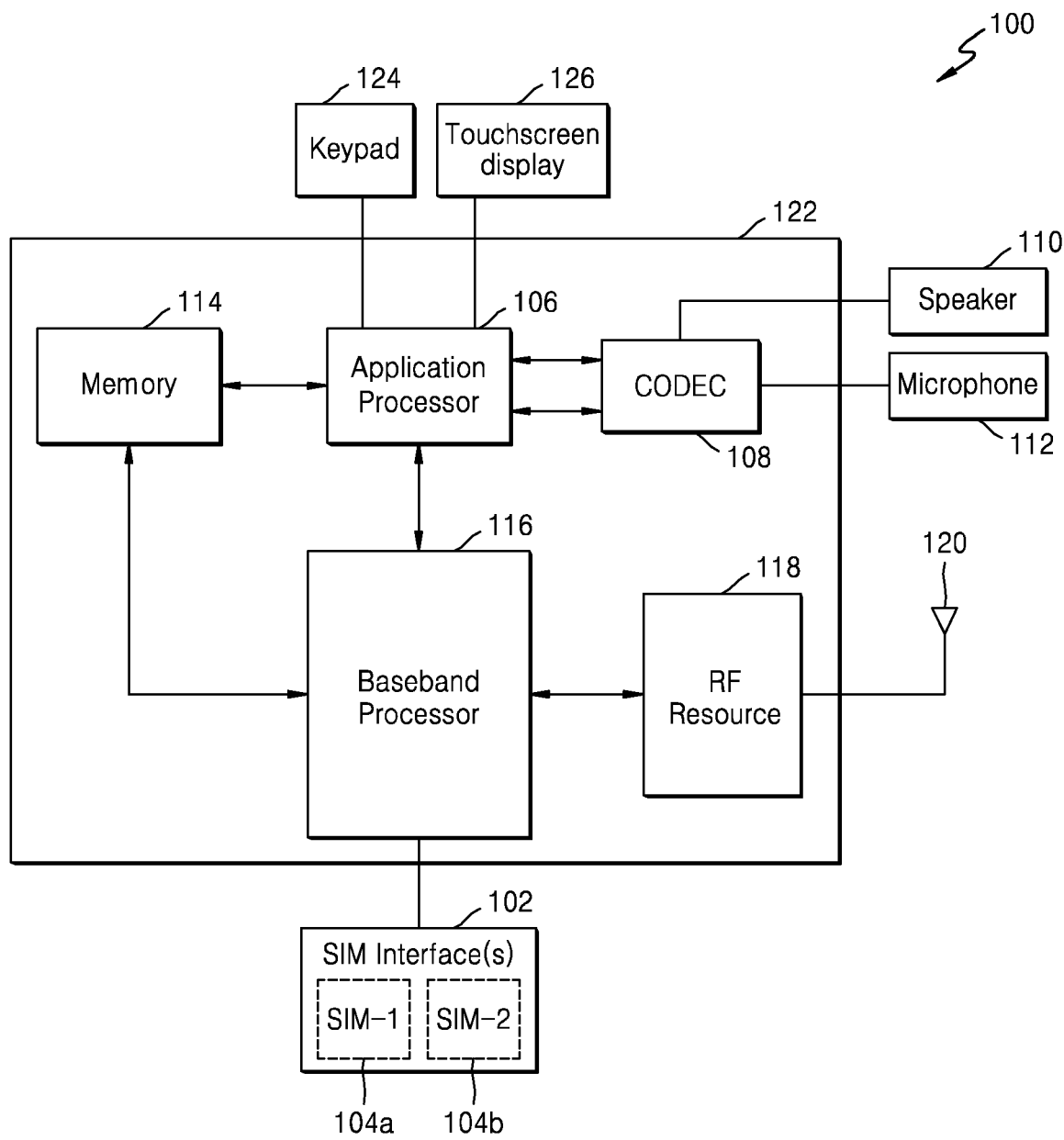
FIG. 1 is a block diagram illustrating a wireless communication apparatus according to an example embodiment of the inventive concepts.

FIG. 1 is a block diagram illustrating a wireless communication apparatus 100 according to an example embodiment of the inventive concepts.

Referring to FIG. 1, the wireless communication apparatus 100 may be a multi-SIM wireless communication apparatus, and hereinafter, it is assumed that the wireless communication apparatus 100 is a dual-SIM wireless communication apparatus. The wireless communication apparatus 100 may be a dual-SIM dual active (DSDA) apparatus or a dual-SIM dual standby (DSDS) apparatus. The wireless communication apparatus 100 may include a SIM interface 102 capable of receiving a first SIM 104a associated with a first subscription and a second SIM 104b associated with a second subscription. Thus, the wireless communication apparatus 100 may include the first SIM 104a and the second SIM 104b, or may be selectively coupled with the first SIM 104a and the second SIM 104b. The SIM in various example embodiments may be a UICC including SIM and/or USIM applications that enable access to various wireless networks. The UICC may provide storage for phone books or other applications. Each of the first SIM 104a and the second SIM 104b may include a CPU, ROM, RAM, EEPROM, and input/output circuits.

The wireless communication apparatus 100 may include an application processor 106 coupled with a codec 108. The codec 108 may be coupled to a speaker 110 and a microphone 112. The application processor 106 may be coupled to at least one memory 114. The memory 114 may be a non-transitory type computer-readable recording medium that stores processor-executable instructions. The memory 114 may store an operating system (OS), application software, and/or executable instructions.

The application processor 106 and the memory 114 may be coupled to a baseband processor 116. Each of the first and second SIMs 104a and 104b in the wireless communication apparatus 100 may be associated with the baseband processor 116 and a radio frequency (RF) resource 118. When the wireless communication apparatus 100 is a DSDS apparatus, the first SIM 104a and the second SIM 104b may share the RF resource 118. When the wireless communication apparatus 100 is a DSDA apparatus, each of the first and second SIMs 104a and 104b may be associated with a separate RF resource 118. For example, the RF resource 118 may include a first RF resource associated with the first SIM 104a and a second RF resource associated with the second SIM 104b. The RF resource 118 may be coupled to at least one antenna 120 and may perform transmission and reception operations for wireless communication services associated with each of the first and second SIMs 104a and 104b of the wireless communication apparatus 100. The RF resource 118 may include a transmitter and a receiver separately, or may include a transceiver that combines transmitter and receiver functions.

The transmitter may be a device that include hardware and any necessary software for transmitting signals via the associated interface to other network elements in the network environment. The receiver may be a device that include hardware and any necessary software for receiving signals via the associated interface to other network elements.

The wireless communication apparatus 100 may include a system-on-chip (SoC) 122. The SoC may be an integrated circuit that may include a microcontroller and peripheral devices integrated on a circuit board.

The system on-chip 122 may include the application processor 106, the codec 108, the memory 114, the baseband processor 116, and the RF resource 118. The first and second SIMs 104a and 104b and the SIM interface 102 corresponding thereto may be outside the system on-chip 122. In addition the wireless communication apparatus 100 may include user input components suitable for the use of the wireless communication apparatus 100, such as, at least one of a keypad 124 and a touchscreen display 126 (or a display device).

However, example embodiments are not limited thereto. For example, the application processor 106 may include any processing circuitry. The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner. The processing circuitry 140 may be configured, through a layout design or execution of computer readable instructions stored in the memory, as a special purpose computer to configure the wireless communication apparatus 100 access different packet switched (PS) networks via a SIM selected from among a plurality of SIMs based on first information and second information, where the first information may indicate preferences of which of the PS networks to utilize for data services, and the second information may indicate capabilities of wireless networks corresponding to the plurality of SIMs.

The SIM interface 102 may be a SIM reader capable of simultaneously receiving the first SIM 104a and the second SIM 104b, or may be an embedded UICC (eUICC) capable of being programmed with the first SIM 104a and the second SIM 104b.

The first and second SIMs 104a and 104b according to an example embodiment of the inventive concepts may support a data service and/or an IMS service over a fourth generation network (e.g., an LTE network). That is, the wireless communication apparatus 100 may access a fourth generation network by using at least one of the first and second SIMs 104a and 104b, so that a user may use a data service or an IMS service. Hereinafter, an LTE network will be described as a fourth generation network. The wireless communication apparatus 100 may access an Internet packet data network for providing a data service from an operator to a user through the LTE network and an IMS packet data network for providing an IMS service from an operator to a user. A wireless network on a Packet Switched (PS) domain, for example, the Internet packet data network and the IMS packet data network, may be referred to as a Packet Switched (PS) network.

However, example embodiments are not limited thereto. For example, in some example embodiments, the wireless communication apparatus 100 may access, using the SIMs 104a, 104b, a 5th generation wireless systems (e.g., a 5G network) that operates in the millimeter wave bands (28, 38, and 60 GHz).

In an example embodiment, the application processor 106 may select a SIM used for Internet packet data network access, based on first information indicating data service-related preferences for the first and second SIMs 104a and 104b. In addition, the application processor 106 may select a SIM used for IMS packet data network access, based on second information provided by an operator corresponding to each of the first and second SIMs 104a and 104b, such as information indicating a wireless network. The application processor 106 may access the Internet packet data network by selecting a SIM from the first and second SIMs 104a and 104b when there is a request to use a data service and may access the IMS packet data network by using the SIM selected from the first and second SIMs 104a and 104b when there is a request to use an IMS service.

In this manner, in the wireless communication apparatus 100 including multi-SIMs for LTE network access, efficient wireless network access management using a multi-SIM is possible by selecting the SIM for accessing the Internet packet data network and the SIM for accessing the IMS packet data network.

Figure 2:
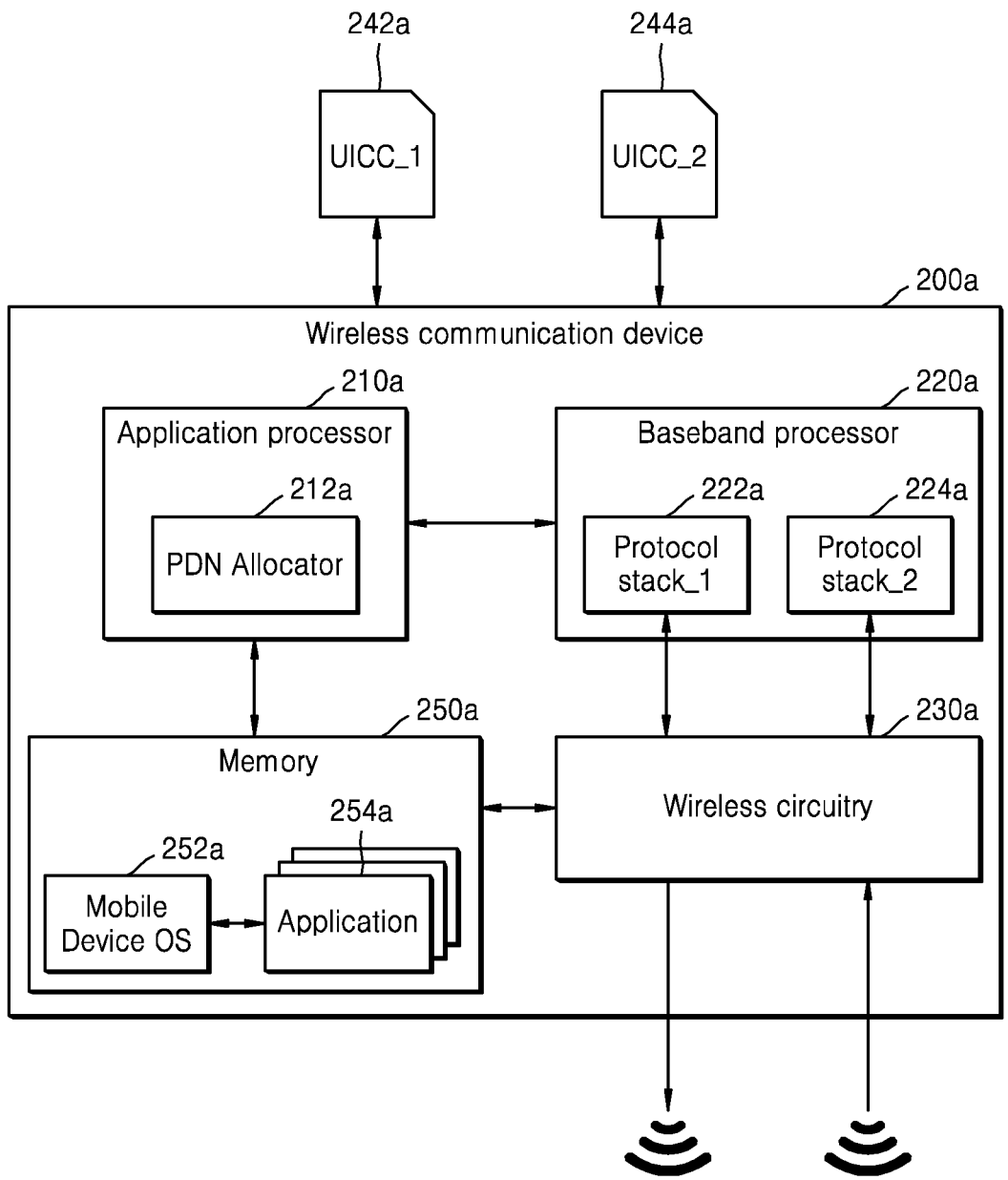
FIG. 2 is a block diagram illustrating a wireless communication apparatus to explain an assignment operation for a wireless network according to an example embodiment of the inventive concepts.

FIG. 2 is a block diagram illustrating a wireless communication apparatus 200a to explain an assignment operation for a wireless network according to an example embodiment of the inventive concepts.

Referring to FIG. 2, the wireless communication apparatus 200a may include an application processor 210a, a baseband processor 220a, wireless circuitry 230a, first and second UICCs 242a and 244a, and a memory 250a. A first SIM may be installed in the first UICC 242a and a second SIM may be installed in the second UICC 244a. The wireless communication apparatus 200a may receive the first SIM through the first UICC 242a and receive the second SIM through the second UICC 244a. The first UICC 242a and the second UICC 244a may be detachable from the wireless communication apparatus 200a, and another UICC may be attached to the wireless communication apparatus 200a and thus the wireless communication apparatus 200a may receive another SIM.

The baseband processor 220a may communicate with each of the first UICC 242a and the second UICC 244a. The baseband processor 220a may include a first protocol stack 222a corresponding to the first SIM and a second protocol stack 222a corresponding to the second SIM. Each of the first protocol stack 222a and the second protocol stack 224a may communicate with wireless network(s) through the wireless circuitry 230a. Specifically, the first protocol stack 222a may communicate with the wireless network(s) through the wireless circuitry 230a by using information (e.g., Access Point Name (APN) information) in the first SIM. The second protocol stack 224a may communicate with the wireless network(s) through the wireless circuitry 230a by using information in the second SIM.

Each of the first and second protocol stacks 222a and 224a may support communication using at least one communication protocol (e.g., a second generation/third generation network-related protocol and/or a fourth generation network-related protocol). However, example embodiments are not limited thereto.

When the wireless communication apparatus 200a is a DSDA apparatus, the first protocol stack 222a and the second protocol stack 224a may communicate with the wireless network(s) in parallel and independently. In this case, the wireless circuitry 230a may include RF circuits that are individually assigned to the first and second protocol stacks 222a and 224a.

When the wireless communication apparatus 200a is a DSDS apparatus, which enables multiple SIMs to be in idle mode waiting to begin communications, but only allows one SIM at a time to participate in an active communication due to sharing of a single radio frequency (RF) resource, the first protocol stack 222a and the second protocol stack 224a may share the wireless circuitry 230a and may not simultaneously communicate with the wireless network(s). For example, when the first protocol stack 222a is in communication with the wireless network(s) (or in a connected state), the second protocol stack 224a may not be in communication with the wireless network(s) (or in an idle state). The second protocol stack 224a that is in the idle state may receive (i.e., listen) a paging message from the wireless network(s) through the wireless circuitry 230a at desired (or, alternatively, predetermined) intervals.

The application processor 210a may control a series of operations so that each of the first and second protocol stacks 222a and 224a communicates with corresponding wireless network(s). In an example embodiment, the application processor 210a may perform an operation related to packet data network assignment as a Packet Data Network (PDN) allocator 215a. The application processor 210a may perform the operation of the PDN allocator 215a by executing certain instructions stored in the memory 250a. However, the example embodiments are not limited thereto, and the application processor 210a may include a PDN allocator 215a corresponding to a hardware logic configuration. The PDN allocator 215a may selectively allocate each of the Internet packet data network for the data service and the IMS packet data network for the IMS service to any one selected from the first protocol stack 222a and the second protocol stack 224a. Specifically, the PDN allocator 215a may allocate the Internet packet data network to any one selected from the first protocol stack 222a and the second protocol stack 224a, based on first information indicating data service-related preferences for SIMs. In addition, the PDN allocator 215a may allocate the IMS packet data network to any one selected from the first protocol stack 222a and the second protocol stack 224a, based on second information indicating a wireless network that may be provided by an operator corresponding to each of the SIMs.

When the PDN allocator 215a allocates a packet data network to a protocol stack, the protocol stack may communicate with the packet data network by using a SIM corresponding to the protocol stack. As an example, when the PDN allocator 215a allocates an Internet packet data network to the first protocol stack 222a, the first protocol stack 222a may access the Internet packet data network by using a first SIM. And then, a user of the wireless communication apparatus 200a may use a data service through the accessed Internet packet data network. That is, an operation of selecting a SIM for accessing any packet data network, from among a plurality of SIMs may be the same as an operation of allocating any packet data network to any one of a plurality of protocol stacks.

The application processor 210a may be coupled to the memory 250a, and the memory 250a may store a mobile device operating system (OS) 252a and at least one application 254a. In an example embodiment, the memory 250a may store first information and second information which the PDN allocator 215a refers to. Also, the first information and the second information stored in the memory 250a may be updated from outside the wireless communication device 200a. Details of the first and second information will be described below. In addition, although the PDN allocator 215a is shown as a block included in the application processor 210a, example embodiments are not limited thereto and the application processor 210a may read the application 254a stored in memory 250a and perform an allocation operation corresponding to the operation of the PDN allocator 215a.

The application processor 210a may provide higher layer functional processing (e.g., an application layer and/or a transport layer), and the baseband processor 220a may provide lower layer functional processing (e.g., a physical layer and/or a network layer).

Figure 3:
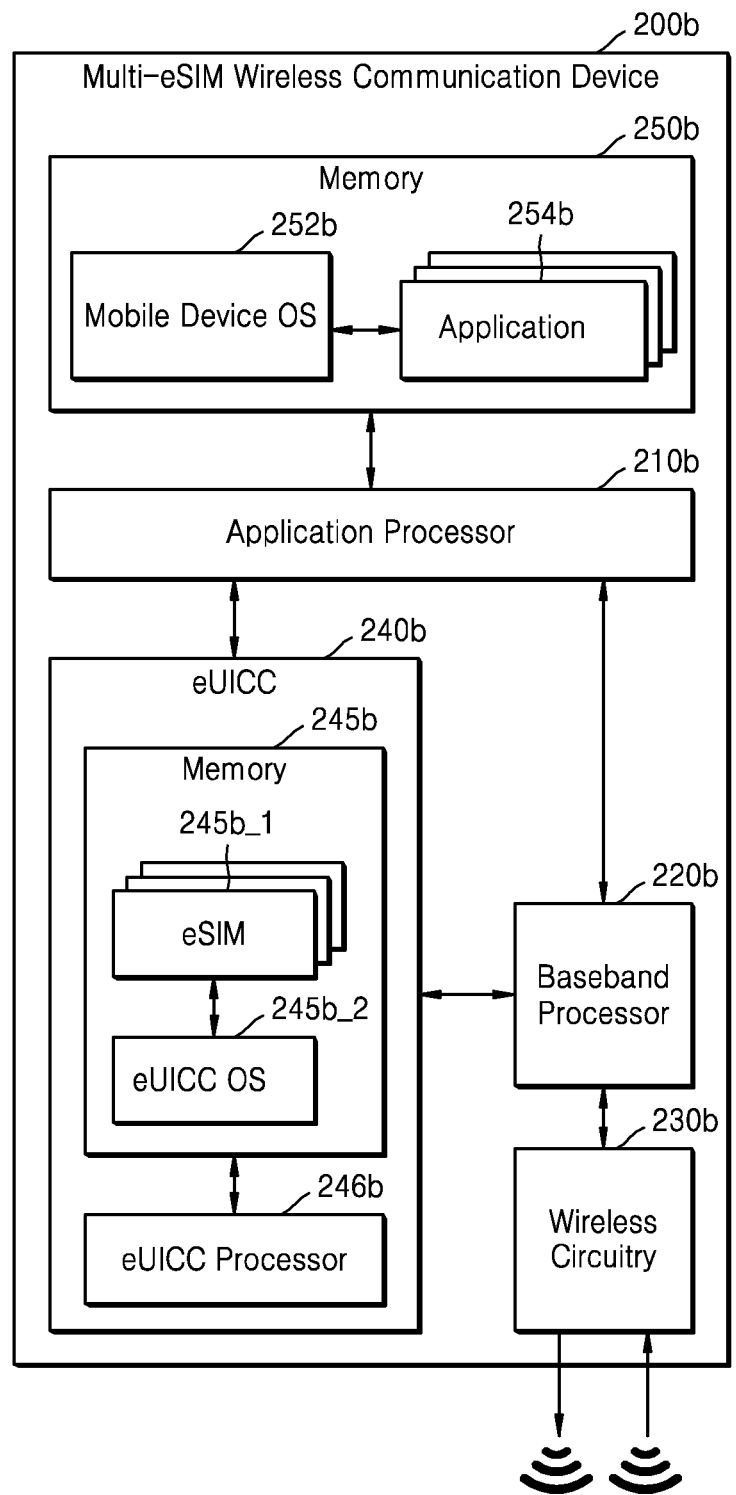
FIG. 3 is a block diagram illustrating a multi-electronic Subscriber Identity Module (multi-eSIM) wireless communication apparatus according to an example embodiment of the inventive concepts.

FIG. 3 is a block diagram illustrating a multi-electronic SIM (eSIM) wireless communication apparatus 200b according to an example embodiment of the inventive concepts.

Referring to FIG. 3, unlike the wireless communication apparatus 200a of FIG. 2, the multi-eSIM wireless communication apparatus 200b may include an embedded UICC (eUICC) 240b. The eUICC 240b may be coupled to an application processor 210b and a baseband processor 220b. The eUICC 240b may be embedded in the multi-eSIM wireless communication apparatus 200b and not removed from the multi-eSIM wireless communication apparatus 200b. As an example, the eUICC 240b may be permanently attached to a circuit board in the multi-eSIM wireless communication apparatus 200b.

At least two eSIMs may be programmed in the eUICC 240b. As an example, the eUICC 240b may be programmed with a first SIM corresponding to the first protocol stack 222a of FIG. 2 and a second SIM corresponding to the second protocol stack 224a. However, example embodiments are not limited thereto, and the multi-eSIM wireless communication apparatus 200b may further include a configuration in which the first UICC 242a and the second UICC 244a may be detachable as in the wireless communication apparatus 200a of FIG. 2, and a first SIM installed in the first UICC 242a and a second SIM installed in the second UICC 244a may be programmed in the eUICC 240b. Each of the eSIMs may include distinct subscriber identity and/or subscriptions for unique wireless communication services or users of the multi-eSIM wireless communication apparatus 200b. The eUICC 240b may include a memory 245b and an eUICC processor 246b. At least two eSIMs 245b_1 and an eUICC operating system 245b_2 may be stored in the memory 245b. The eUICC processor 246b may enable the eUICC operating system 245b_2 to manage the eSIMs 245b_1. The application processor 210b, the eUICC processor 246b and the baseband processor 220b may operate such that the multi-eSIM wireless communication apparatus 200b may be coupled to at least one wireless network.

Figure 4:
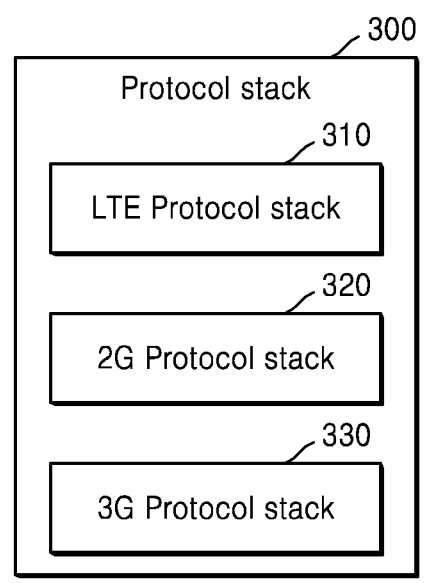
FIG. 4 is a block diagram illustrating a protocol stack in detail.

FIG. 4 is a block diagram illustrating a protocol stack 300 in detail.

Referring to FIG. 4, an application processor of a wireless communication apparatus may access wireless network(s) through a protocol stack 300 corresponding to a SIM. That is, the protocol stack 300 may support communication based on at least one wireless communication protocol. As an example, when the protocol stack 300 may support communication with a second generation network (e.g., 2G GSM and 2G CDMA 2000), a third generation network (e.g., 3G Universal Mobile Telecommunication System (UMTS)), and/or a fourth generation network (e.g., 4G LTE), the protocol stack 300 may include an LTE protocol stack 310, a second generation protocol stack 320, and a third generation protocol stack 330. However, example embodiments are not limited thereto. The application processor may refer to a wireless communication service that may be supported by the SIM and allocate the wireless network (s) to the protocol stack 300 corresponding to the SIM.

As an example, when a service that may be supported by the SIM is a voice service such as a normal voice call service, the application processor may allocate the second generation network and the third generation network to the second generation protocol stack 320 and the third generation protocol stack 330, respectively. Accordingly, the application processor may access the second and third generation networks through the second and third generation protocol stacks 320 and 330 when there is a request for a voice service, and thus, a user may use the voice service. Hereinafter, for convenience of description, the second generation protocol stack 320 and the third generation protocol stack 330 will be collectively referred to as a second generation/third generation protocol stack.

Figure 5A:
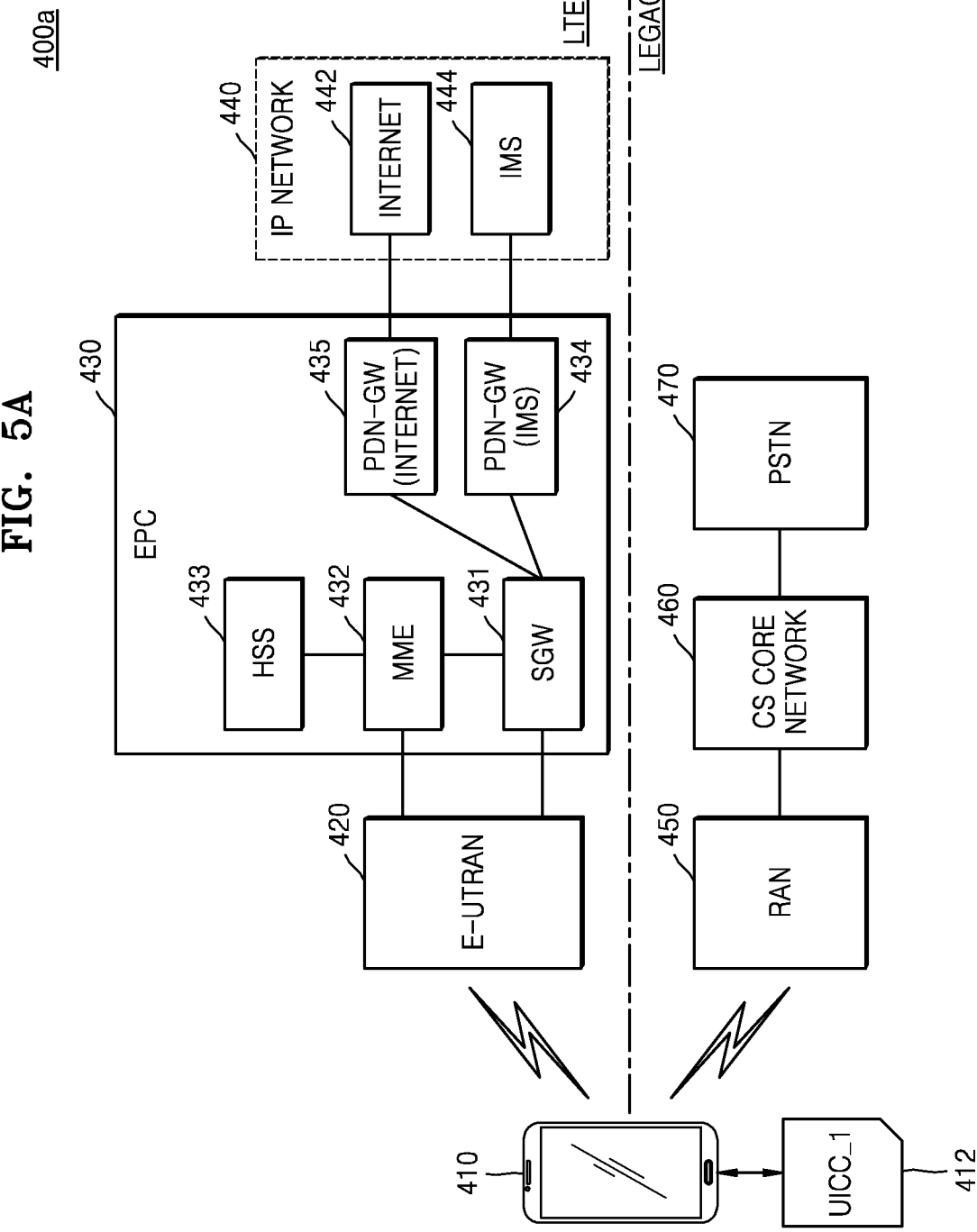
FIGS. 5A and 5B are diagrams illustrating wireless networks that may be provided by an operator.
Figure 5B:
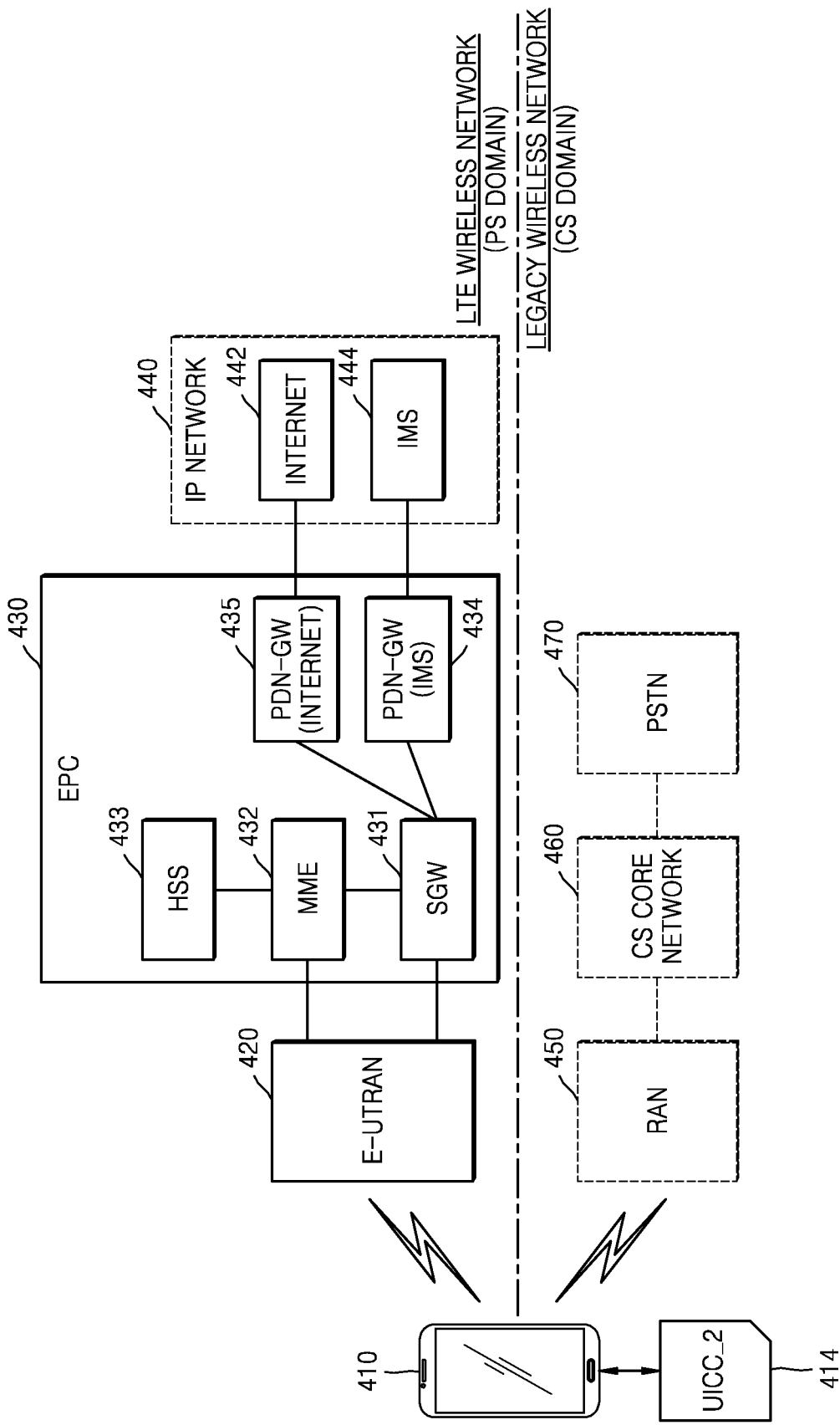

FIGS. 5A and 5B are diagrams illustrating wireless networks 400a and 400b that may be provided by an operator.

FIG. 5A illustrates the wireless network 400a that may be provided by a first operator associated with a first UICC 412. The wireless network 400a, which may be provided by the first operator, may include an LTE wireless network and a legacy wireless network. The legacy wireless network may be a second/third generation network. The LTE wireless network may be referred to as a network on a PS domain, and the legacy network may be referred to as a network on a CS domain. Referring to FIG. 5A, an Evolved Packet Core (EPC) network 430 may include a Serving GateWay (SGW) 431, a Mobility Management Entity (MME) 432, a Home Subscriber Server (HSS) 433, and first and second Packet Data Network GateWays (PDN-GWs) 434 and 435.

A wireless communication apparatus 410 on the LTE wireless network may be connected to an Evolved-UMTS Terrestrial Radio Access Network (E-UTRAN) 420 including a plurality of eNodes (or LTE base stations). The E-UTRAN 420 may be coupled to the SGW 431 and the MME 432. The MME 432 coupled to the SGW 431 may manage the tracking and paging of the wireless communication apparatus 410 and the security for the E-UTRAN 420 on the EPC network 430. The MME 432 may be coupled to the HSS 433 that may support a database having subscriber subscriptions, profiles and authentication information.

The SGW 431 may route packet data for the wireless communication apparatus 410 through an IP network 440. The IP network 440 may include an Internet packet data network 442 and an IMS packet data network 444. The wireless communication apparatus 410 may access the Internet packet data network 442 so that a user may use data service, and may access the IMS packet data network 444 so that a user may use an IMS service. The first PDN-GW 434 may establish a connection between the IMS packet data network 444 connected to an IP multimedia subsystem and the EPC network 430 to route IMS packet data. The second PDN-GW 435 may establish a connection between the Internet packet data network 442 connected to a plurality of Internet servers and the EPC network 430 to route Internet packet data. This allows a user to use a data service and an IMS service (e.g., IMS call or VoLTE) through the LTE wireless network. That is, the wireless communication apparatus 410 may access the LTE wireless network by using a first SIM corresponding to the first UICC 412, and as a result, a user may use the data service and the IMS service.

The wireless communication apparatus 410 on the legacy wireless network may be connected to a Radio Access Network (RAN) 450 that includes a plurality of eNodes (or base stations). The wireless communication apparatus 410 may be configured to access various wireless networks providing at least a voice service through a Public Switched Telephone Network (PSTN) 470 independently. Specifically, the wireless communication apparatus 410 may access a CS core network 460 through the RAN 450, and a user may use a CS-based voice service through the PSTN 470. That is, the wireless communication apparatus 410 may access the PSTN 470 by using the first SIM, and as a result, a user may use the CS-based voice service.

The wireless communication apparatus 410 may be configured to perform a multi-mode operation, and the wireless communication apparatus 410 may include a plurality of transceivers for communication with wireless networks by using different radio access technologies. For example, when the wireless communication apparatus 410 is a dual-SIM wireless communication apparatus, the wireless communication apparatus 410 may be configured to communicate over a plurality of wireless networks on subscriptions that correspond to respective SIMs.

FIG. 5B illustrates the wireless network 400b that may be provided by a second operator associated with a second UICC 414. The wireless network 400b, which may be provided by the second operator, may include an LTE wireless network. The second operator may not provide a legacy network unlike the first operator of FIG. 5A. Referring to FIG. 5B, the wireless communication apparatus 410 may access an IP network 440 through an E-UTRAN 420 and an EPC network 430 by using a second SIM corresponding to the second UICC 414, and as a result, a user may use a data service and an IMS service. However, the wireless communication apparatus 410 may not use a CS-based voice service through a PSTN 470 because the second operator may not provide the legacy wireless network.

An operation of selecting a SIM for accessing an Internet packet data network and a SIM for accessing an IMS packet data network may be performed considering wireless network(s) that may be provided by operators corresponding to respective SIMs included in the wireless communication apparatus 410.

Figure 6:
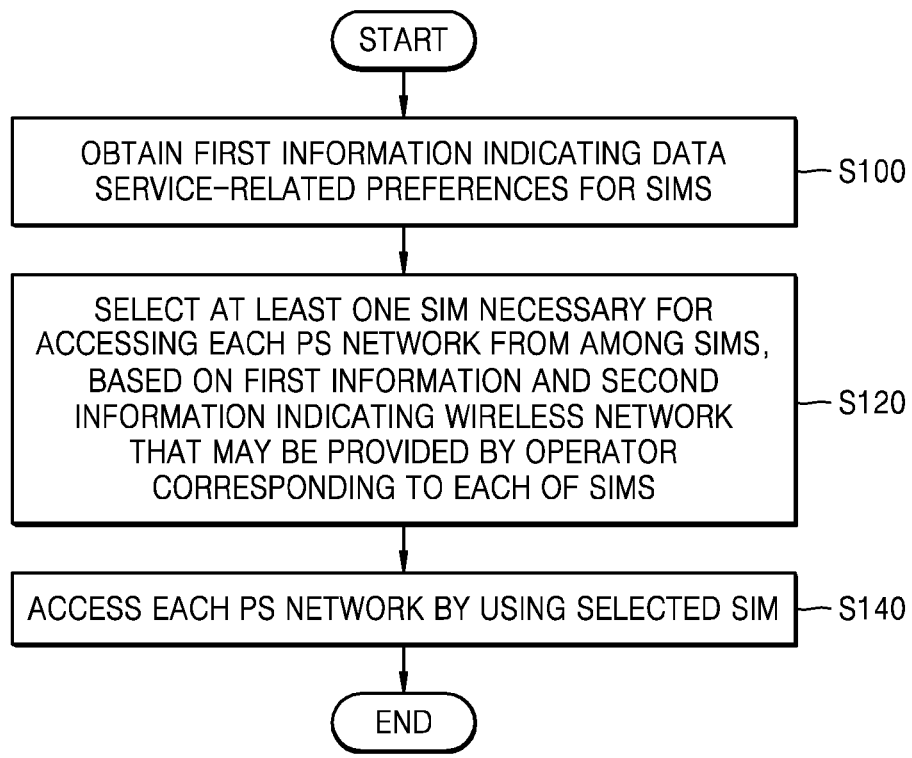
FIG. 6 is a flowchart illustrating a method of managing access to Packet Switched (PS) networks, according to an example embodiment of the inventive concepts.
Figure 7:
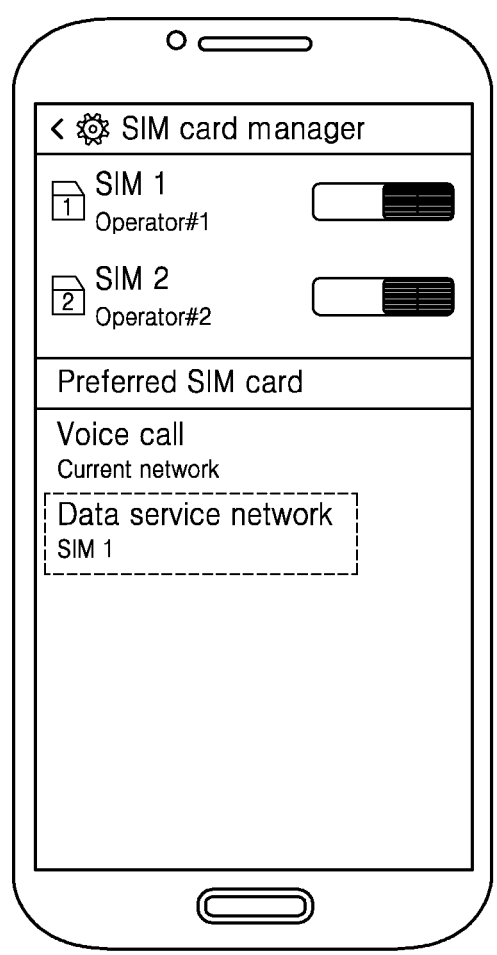
FIG. 7 is a view illustrating a method of acquiring first information in FIG. 6.

FIG. 6 is a flowchart illustrating a method of managing access to PS networks, according to an example embodiment of the inventive concepts, and FIG. 7 is a diagram illustrating a method of acquiring first information in FIG. 6.

Referring to FIGS. 1 and 6, in operation S100, the wireless communication apparatus 100 may obtain first information indicating data service-related preferences for the first SIM 104a and the second SIM 104b.

Referring to FIG. 7, the application processor 106 may execute software that performs the functions of a SIM card manager, and may display SIM information on the SIM card manager to a user through the touchscreen display 126 of the wireless communication apparatus 100. The user may select either the first SIM 104a or the second SIM 104b through the touchscreen display 126 as a preferred SIM card when using a data service network (or a data service). The application processor 106 may store a result of the selection as first information in the memory 114 of the wireless communication apparatus 100. However, the example embodiments are not limited thereto, and the first information may be received from the user through various user input components including the keypad 124 of the wireless communication apparatus 100. The application processor 106 may retrieve the first information from the touchscreen display 126 and/or from the memory 114. In FIG. 7, as an example, it is assumed that the first SIM 104a is selected as the preferred SIM when using the data service.

Referring back to FIG. 6, thereafter, in operation S120, the application processor 106 may select at least one SIM for accessing each PS network based on first information and second information indicating a wireless network that may be provided by operators Operator #1 and Operator #2 corresponding to the first and second SIMs 104a and 104b, respectively.

In operation S140, the application processor 106 may access each of the PS networks (e.g., an Internet packet data network and an IMS packet data network), by using a selected SIM when there is a data service request and/or an IMS service request.

Figure 8:
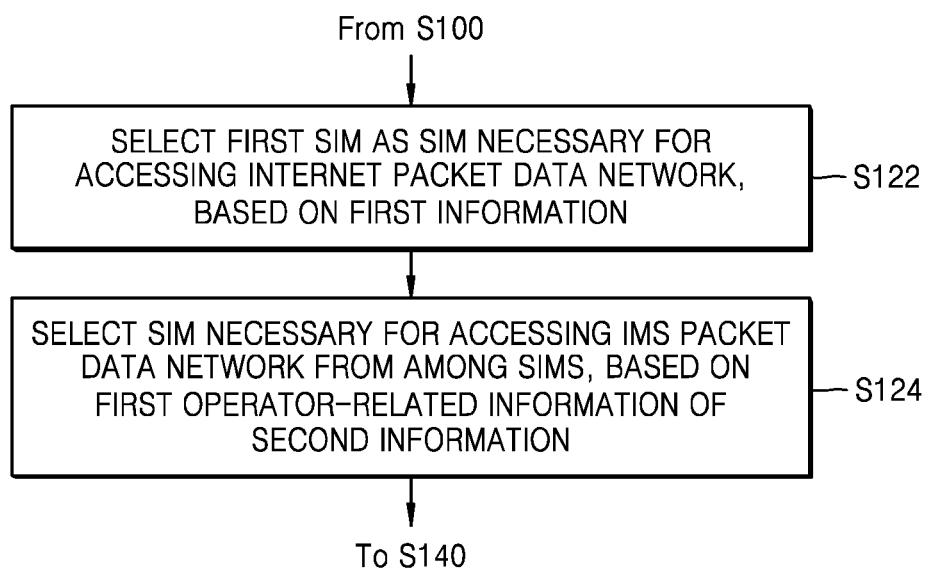
FIG. 8 is a flowchart illustrating a method of selecting a Subscriber Identity Module (SIM) for accessing PS networks, according to an example embodiment of the inventive concepts.
Figure 9:
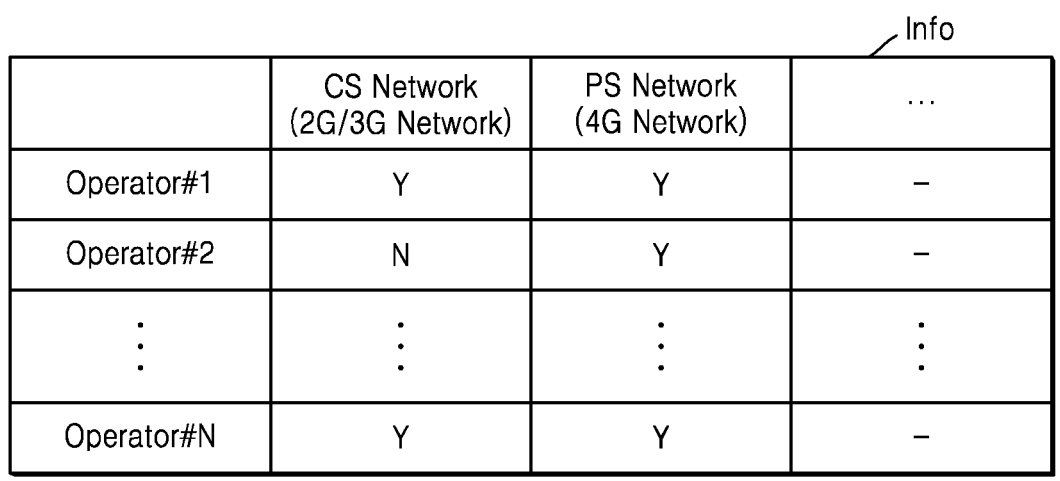
FIG. 9 is a diagram illustrating second information in FIG. 8.

FIG. 8 is a flowchart illustrating a method of selecting a SIM for accessing PS networks, according to an example embodiment of the inventive concepts, and FIG. 9 is a diagram illustrating second information in FIG. 8.

Referring to FIGS. 1, 6 and 8, when performing operation S120, the application processor 106 may perform operations S122 and S124.

For example, in operation S122, the application processor 106 may select the first SIM 104a as a SIM for accessing an Internet packet data network, based on first information. That is, as in FIG. 7, since a user has selected the first SIM 104a as a preferred SIM card at the time of using a data service, the application processor 106 may access the Internet packet data network by using the first SIM 104a.

Further, in operation S124, the application processor 106 may select a SIM for accessing the IMS packet data network from among the first and second SIMs 104a and 104b, based on first operator-related information of second information indicating a wireless network that may be provided by first and second operators Operator #1 and Operator #2 corresponding to the first and second SIMs 104a and 104b, respectively. Details of Operation S124 will be described with reference to FIGS. 9 and 10.

Referring to FIG. 9, in an example embodiment, the memory 114 of the wireless communication apparatus 100 may store second information Info indicating a wireless network that may be provided by each of the first operator Operator #1 corresponding to the first SIM 104a and the second operator Operator #2 corresponding to second SIM 104b. Furthermore, the second information Info may further include information indicating a wireless network that may be provided by each of third to Nth operators Operator #3 to Operator # N corresponding to SIMs other than the first and second SIMs 104a and 104b.

The application processor 106 may refer to the second information Info and identify a wireless network that may be provided by each of the first to Nth operators Operator #1 to Operator # N.

For example, the application processor 106 may determine that the first operator Operator #1 may provide a CS network (or a second/third generation network) of a CS domain and a PS network (or a fourth generation network) of a PS domain, and may determine that the second operator Operator #1 may not provide the CS network and may provide the PS network. When any operator later constructs a network and provides a new wireless network, the second information Info may be updated periodically or by an external request to reflect new information. The application processor 106 may perform Operation S124 based on the second information Info., and details of Operation S124 will be described with reference to FIG. 10.

Figure 10:
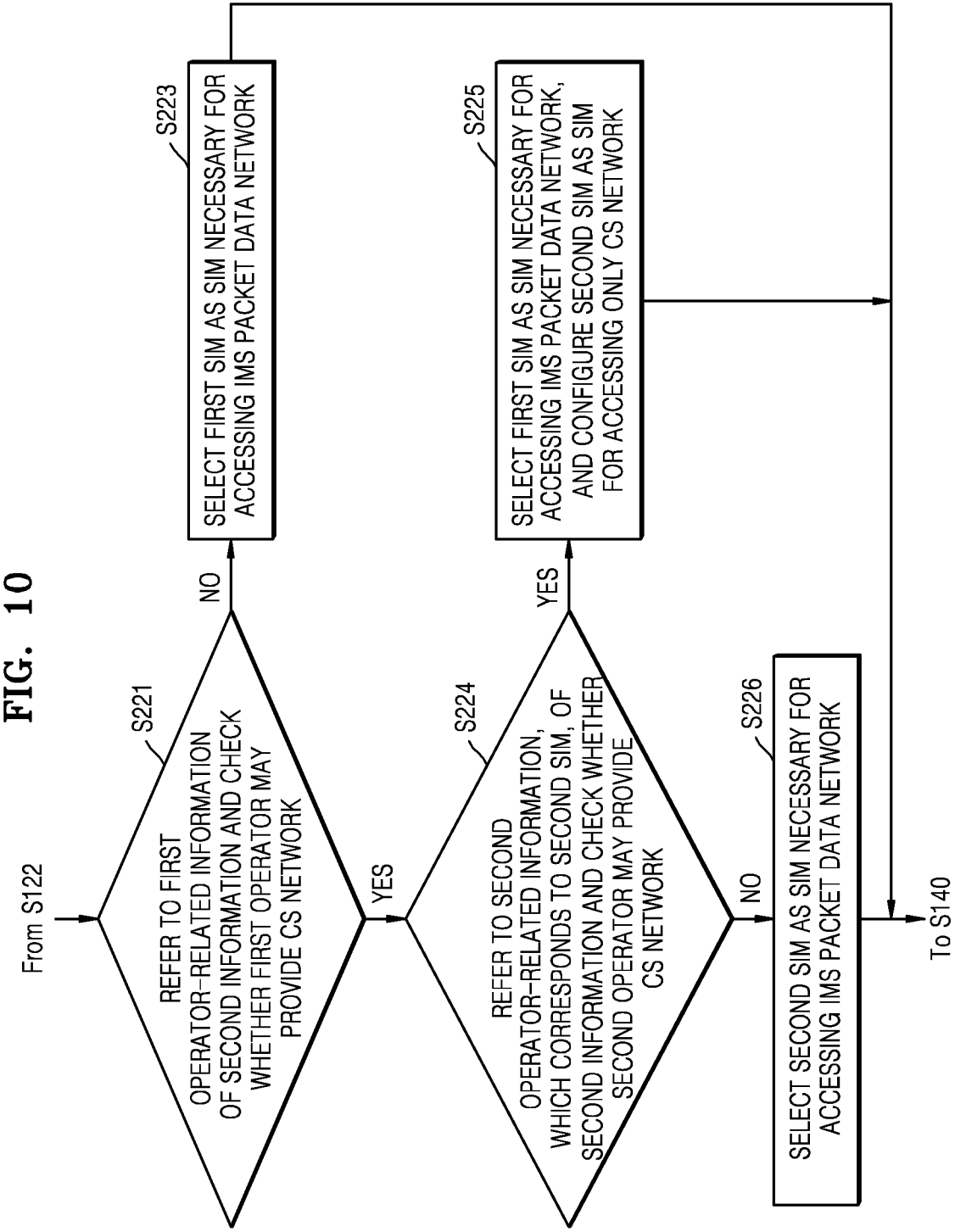
FIG. 10 is a flowchart illustrating a method of selecting a SIM for accessing an IMS packet data network, according to an example embodiment of the inventive concepts.
Figure 11:
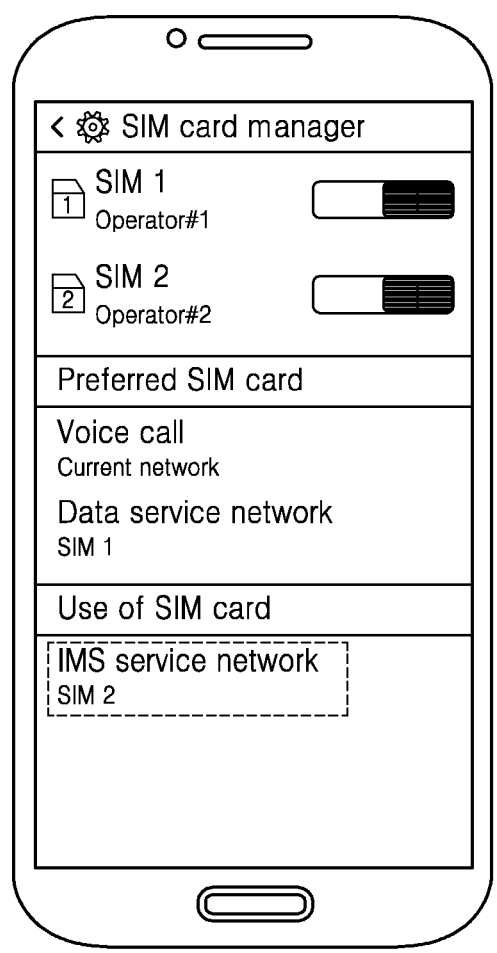
FIG. 11 is a diagram illustrating SIM information provided from the wireless communication apparatus of FIG. 1.

FIG. 10 is a flowchart illustrating a method of selecting a SIM for accessing an IMS packet data network, according to an example embodiment of the inventive concepts, and FIG. 11 is a diagram illustrating SIM information provided from the wireless communication apparatus 100 of FIG. 1.

Hereinafter, as in FIG. 7, it is assumed that the first SIM 104a is selected as a preferred SIM card at the time of using a data service.

Referring to FIGS. 1 and 10, after Operation S122, when performing operation S124, the application processor 106 may perform operations S221 to S226.

For example, in operation S221, the application processor 106 may refer to first operator-related information, which corresponds to the first SIM 104a, of the second information and check whether a first operator may provide a CS network.

When the first operator may not provide the CS network (Operation S221, NO), in operation S223, the application processor 106 may select the first SIM 104a as a SIM for accessing an IMS packet data network. That is, since the first operator may not provide the CS network, the application processor 106 is unable to provide a CS-based voice service to a user by using the first SIM 104a. Thus, the application processor 106 may perform Operation S223 to provide an IMS service (e.g., IMS call or VoLTE) to a user by using the first SIM 104a.

When the first operator may provide the CS network (Operation S221, YES), in operation S224, the application processor 106 may provide a CS-based voice service to a user by using the first SIM 104a because the first operator may provide the CS network. Thus, the application processor 106 may consider providing an IMS call or VoLTE to a user by using the second SIM 104b while providing a CS-based voice service to the user by using the first SIM 104a. The application processor 106 may refer to second operator-related information, which corresponds to the second SIM 104b, of the second information and check whether a second operator may provide a CS network.

When the second operator may provide the CS network (Operation S224, YES), in operation S225, the application processor 106 may select the first SIM 104a as a SIM for accessing an IMS packet data network, and may also configure the second SIM 104b as a SIM for accessing only a CS network.

When the second operator may not provide the CS network (Operation S224, NO), in operation S226, the application processor 106 may select the second SIM 104b as a SIM for accessing the IMS packet data network. That is, since the second operator may not provide the CS network, the application processor 106 is not able to provide a CS-based voice service to a user by using the second SIM 104b. Thus, the application processor 106 may perform Operation S226 to provide an IMS service (e.g., IMS call or VoLTE) to a user by using the second SIM 104b.

After Operation S223, Operation S225, or Operation S226, the application processor 106 may perform Operation S140 to access each of the PS networks by using a SIM selected based on the first information and the second information.

As described above, through a management method of the wireless communication apparatus 100 related to a wireless network access, which reflects a wireless network status available from an operator corresponding to each of the first and second SIMs 104a and 104b of the wireless communication apparatus 100, it is possible to provide various services to a user.

Referring to FIG. 11, the application processor 106 may execute software to perform the function of a SIM card manager to manage SIM information used to provide an IMS service network (or IMS service) to a user. That is, when the second SIM 104b is selected as a SIM for accessing an IMS packet data network, the SIM card manager may display information "Use of SIM card" about SIM card usage, which includes information about the selected second SIM 104b, to a user through the touchscreen display 126. However, the example embodiments are not limited thereto, and the SIM card manager may provide the information "Use of SIM card" about SIM card usage to a user through various user output components including the speaker 110 of the wireless communication apparatus 100 as well as the touchscreen display 126.

Figure 12:
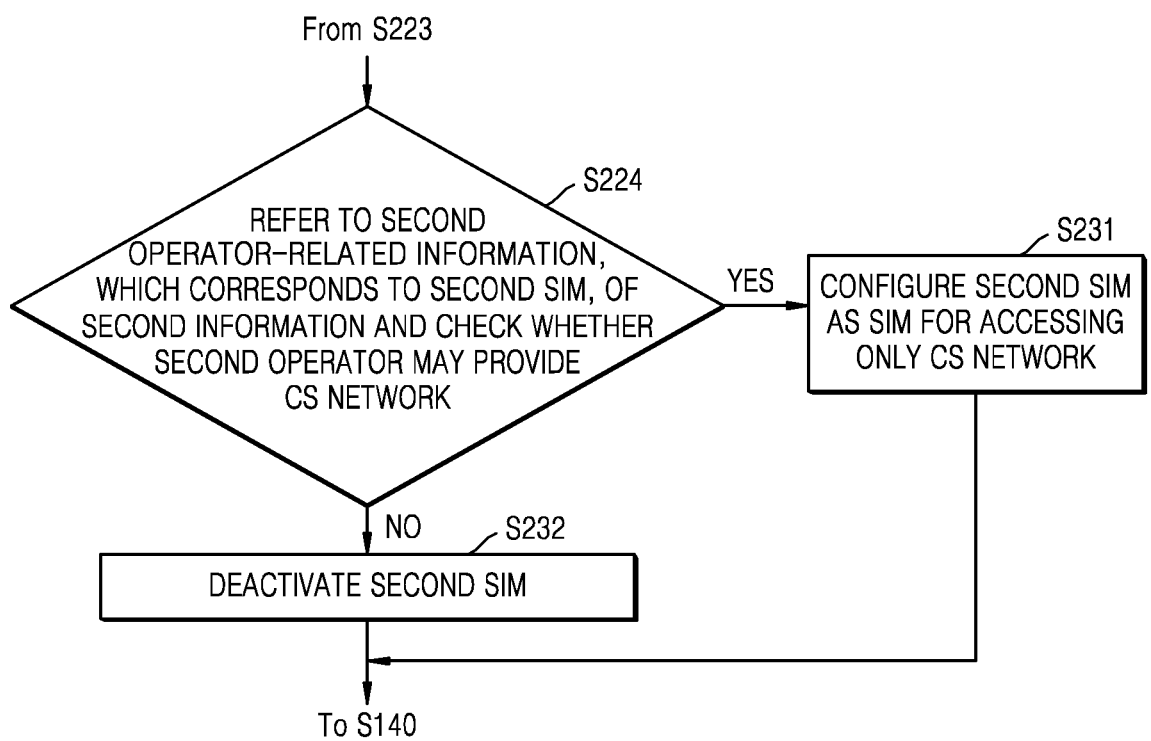
FIG. 12 is a flowchart illustrating a configuration operation for a second SIM after Operation S223 in FIG. 10, according to an example embodiment of the inventive concepts.
Figure 13:
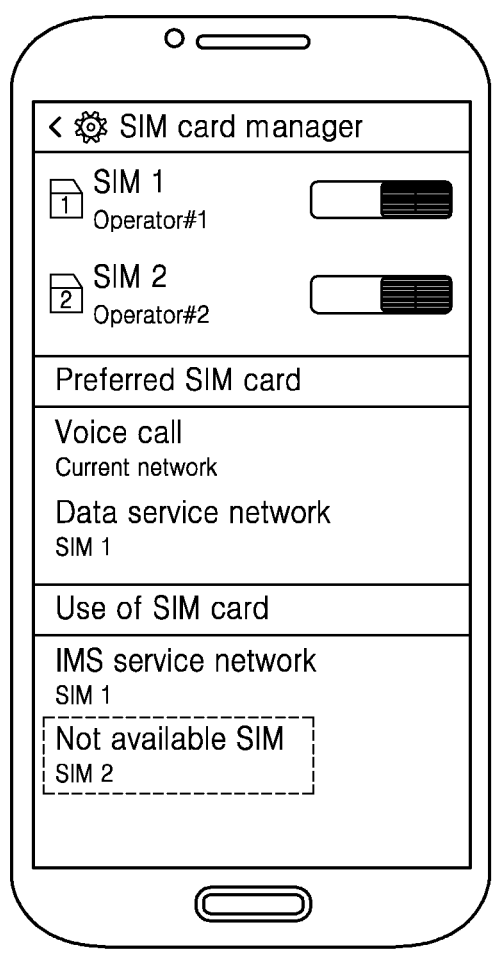
FIG. 13 is a diagram illustrating SIM information provided from the wireless communication apparatus of FIG. 1.

FIG. 12 is a flowchart illustrating a configuration operation for the second SIM 104b after Operation S223 in FIG. 10, according to an example embodiment of the inventive concepts, and FIG. 13 is a diagram illustrating SIM information provided from the wireless communication apparatus 100 of FIG. 1.

Referring to FIGS. 1 and 12, after Operation S223, rather than proceed to operation S140, the application processor 106 may perform in Operation S224 and refer to second operator-related information, which corresponds to the second SIM 104b, of the second information and check whether a second operator may provide a CS network.

When the second operator may provide the CS network (Operation S224, YES), only the CS network may be accessed using the second SIM 104b and thus, in operation S231, the application processor 106 may configure the second SIM 104b as a SIM for accessing only the CS network.

When the second operator may not provide the CS network (Operation S224, NO), no wireless network may be accessed using the second SIM 104b and thus, in operation S232, the application processor 106 may deactivate the second SIM 104b. As a result, it is possible to reduce the waste of RF resources by preventing an operation of receiving (or searching) a paging message from wireless network(s) associated with the second SIM 104b later.

After Operation S231 or Operation S232, the application processor 106 may perform Operation S140.

Referring to FIG. 13, the application processor 106 may execute software to configure the application processor 106 to perform the functions of a SIM card manager and manage unusable SIM information. That is, the SIM card manager may display information "Use of SIM card" about SIM card usage, which includes information about a deactivated second SIM 104b and information indicating that the second SIM 104b is deactivated and unusable, to a user through the touchscreen display 126. However, example embodiments are not limited thereto, and the SIM card manager may provide the information "Use of SIM card" about SIM card usage to a user through various user output components including the speaker 110 of the wireless communication apparatus 100 as well as the touchscreen display 126.

Figure 14A:
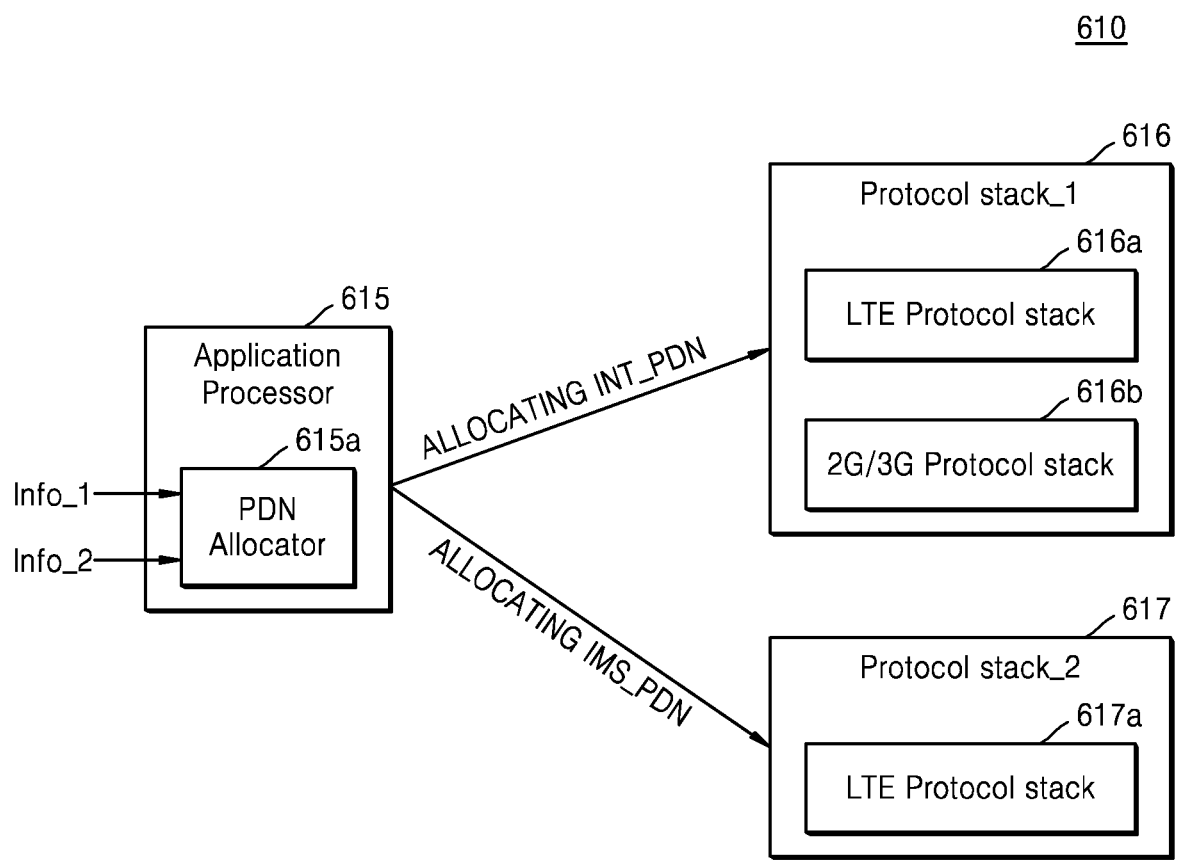
FIG. 14A is a block diagram illustrating an allocation operation for a PS network according to an example embodiment of the inventive concepts.
Figure 14B:
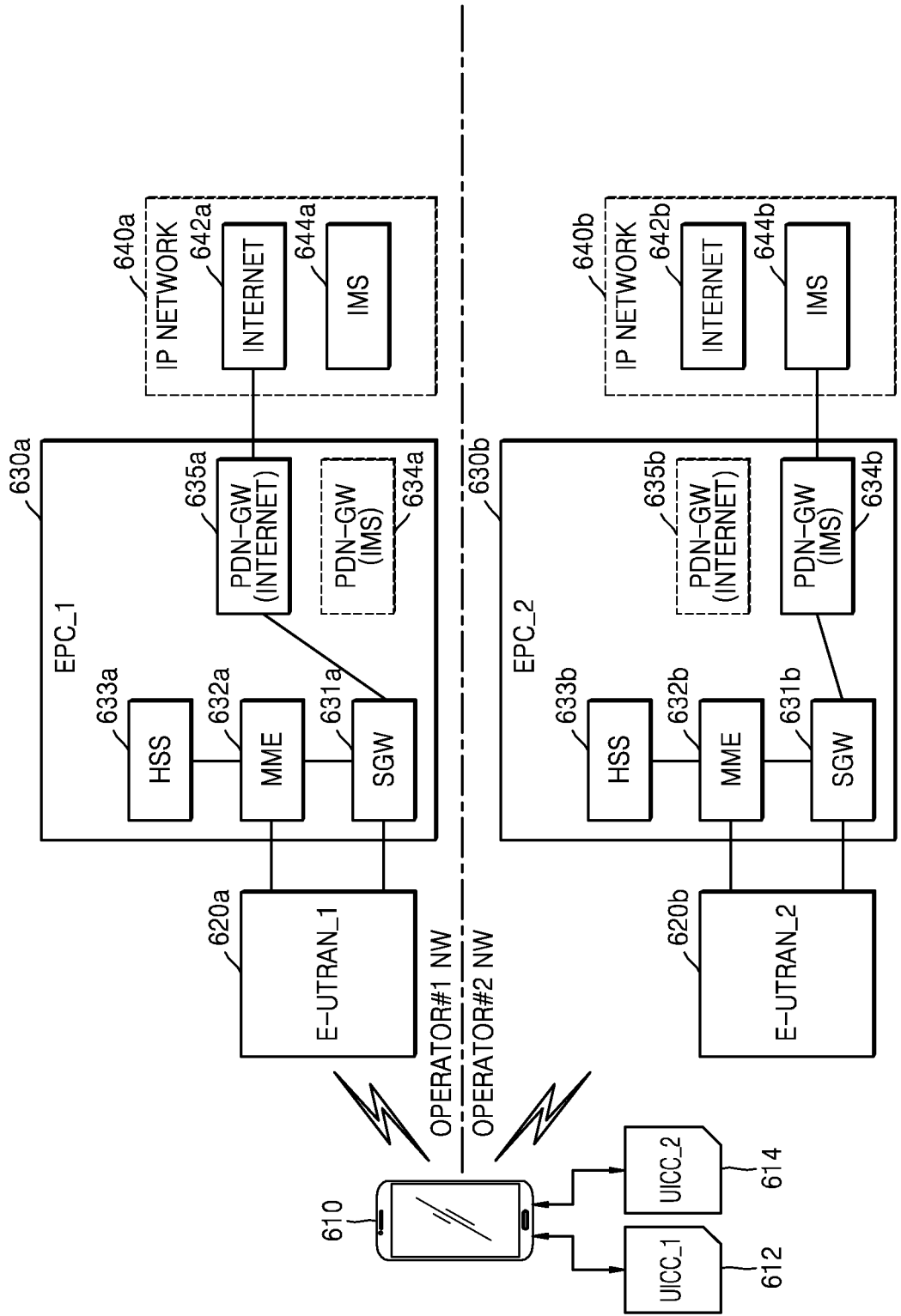
FIG. 14B is a block diagram illustrating an access operation of a wireless network of a wireless communication apparatus based on a result of the allocation operation of FIG. 14A.

FIG. 14A is a block diagram illustrating an allocation operation for a PS network according to an example embodiment of the inventive concepts, and FIG. 14B is a block diagram illustrating an access operation of a wireless network of a wireless communication apparatus 610 based on a result of the allocation operation of FIG. 14A.

In FIG. 14A, it is assumed that a SIM preferred when using a data service is a first SIM, a first operator corresponding to the first SIM is capable of providing a PS network and a CS network, and a second operator corresponding to a second SIM is capable of providing a PS network. An operation of a PDN allocator 615a of an application processor 615 after operation S226 in FIG. 10 will be described with reference to FIG. 14A. For example, the operation of the PDN allocator 615a of the application processor 615 when performing operation S140 in FIG. 6 when the second SIM is used for accessing IMS packet data network will be described below.

Referring to FIG. 14A, the wireless communication apparatus 610 may include an application processor 615 and access wireless network(s) by using a first protocol stack 616 and a second protocol stack 617. The first protocol stack 616 corresponding to a first SIM may include an LTE protocol stack 616a and a second generation/third generation protocol stack 616b, and the second protocol stack 617 corresponding to a second SIM may include an LTE protocol stack 617a. A PDN allocator 615a of the application processor 615 may allocate an Internet packet data network INT_PDN and an IMS packet data network IMS_PDN to at least one of the first protocol stack 616 and the second protocol stack 617, based on first information Info_1 indicating data service-related preferences for SIMs and second information Info_2 indicating a wireless network that may be provided by an operator corresponding to each of the SIMs.

Specifically, based on the first information Info_1 and the second information Info_2, the PDN allocator 615a may allocate the Internet packet data network INT_PDN to the LTE protocol stack 616a of the first protocol stack 616 and allocate the IMS packet data network IMS_PDN to the LTE protocol stack 617a of the second protocol stack 617.

Referring to FIG. 14B, a first operator network OPERATOR #1 NW which a first operator may provide to the wireless communication apparatus 610 based on a first SIM of a first UICC 612 may include a first E-UTRAN 620a and a first EPC 630a. As a result of the allocation operation of the PDN allocator 615a, the wireless communication apparatus 610 may access an Internet packet data network 642a through the first operator network OPERATOR #1 NW, by using the first protocol stack 640, when there is a data service request.

A second operator network OPERATOR #2 NW which a second operator may provide to the wireless communication apparatus 610 based on a second SIM of a second UICC 614 may include a second E-UTRAN 620b and a second EPC 630b. As a result of the allocation operation of the PDN allocator 615a, the wireless communication apparatus 610 may access an IMS packet data network 644b through the second operator network OPERATOR #2 NW, by using the second protocol stack 617, when there is an IMS service request. Detailed operations of the first UICC 612, the second UICC 614, SGWs 631a and 631b, MMEs 632a and 632b, HSSs 633a and 633b, and PDN-GWs 634a, 634b, 635a, and 635b are the same as described above and thus are omitted below.

Figure 15A:
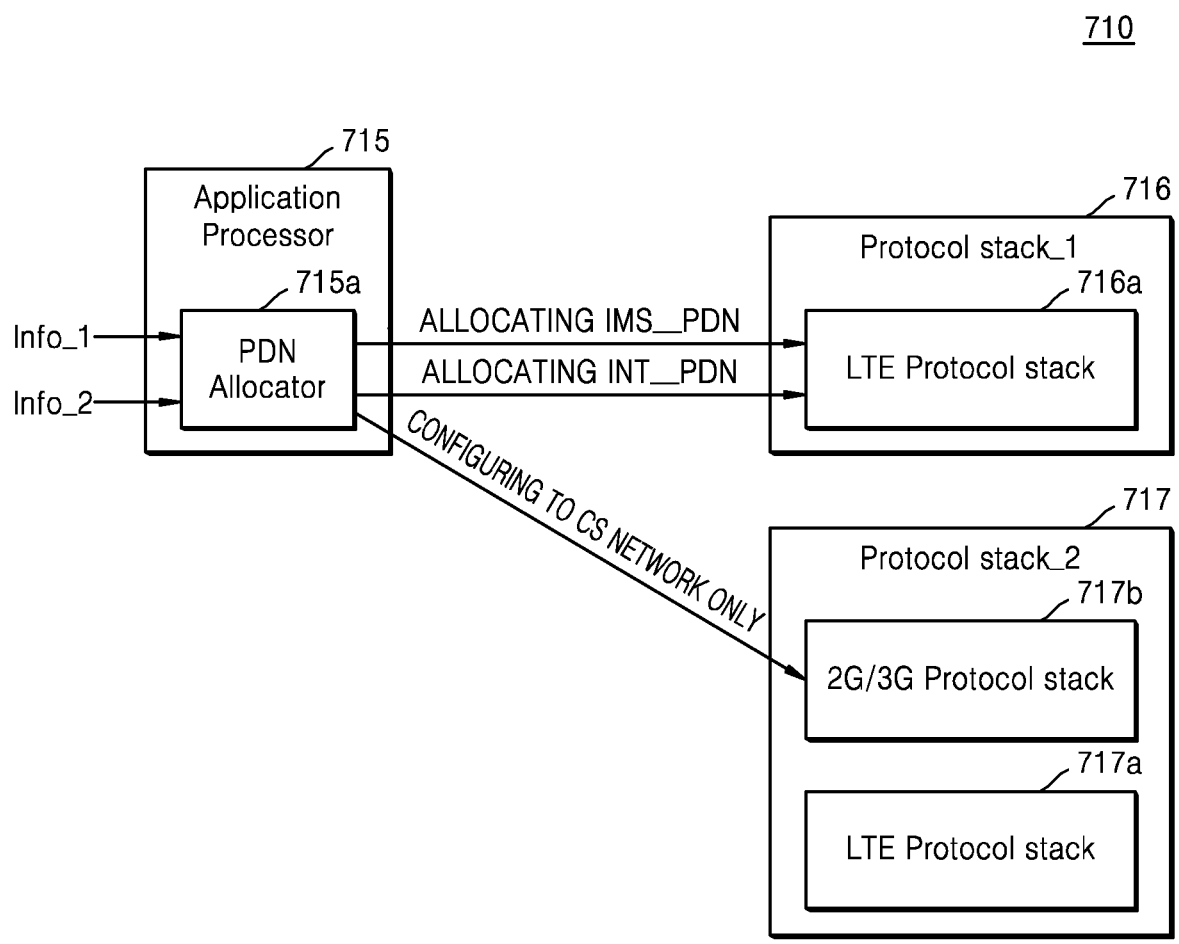
FIG. 15A is a block diagram illustrating an allocation operation for a PS network according to another example embodiment of the inventive concepts.
Figure 15B:
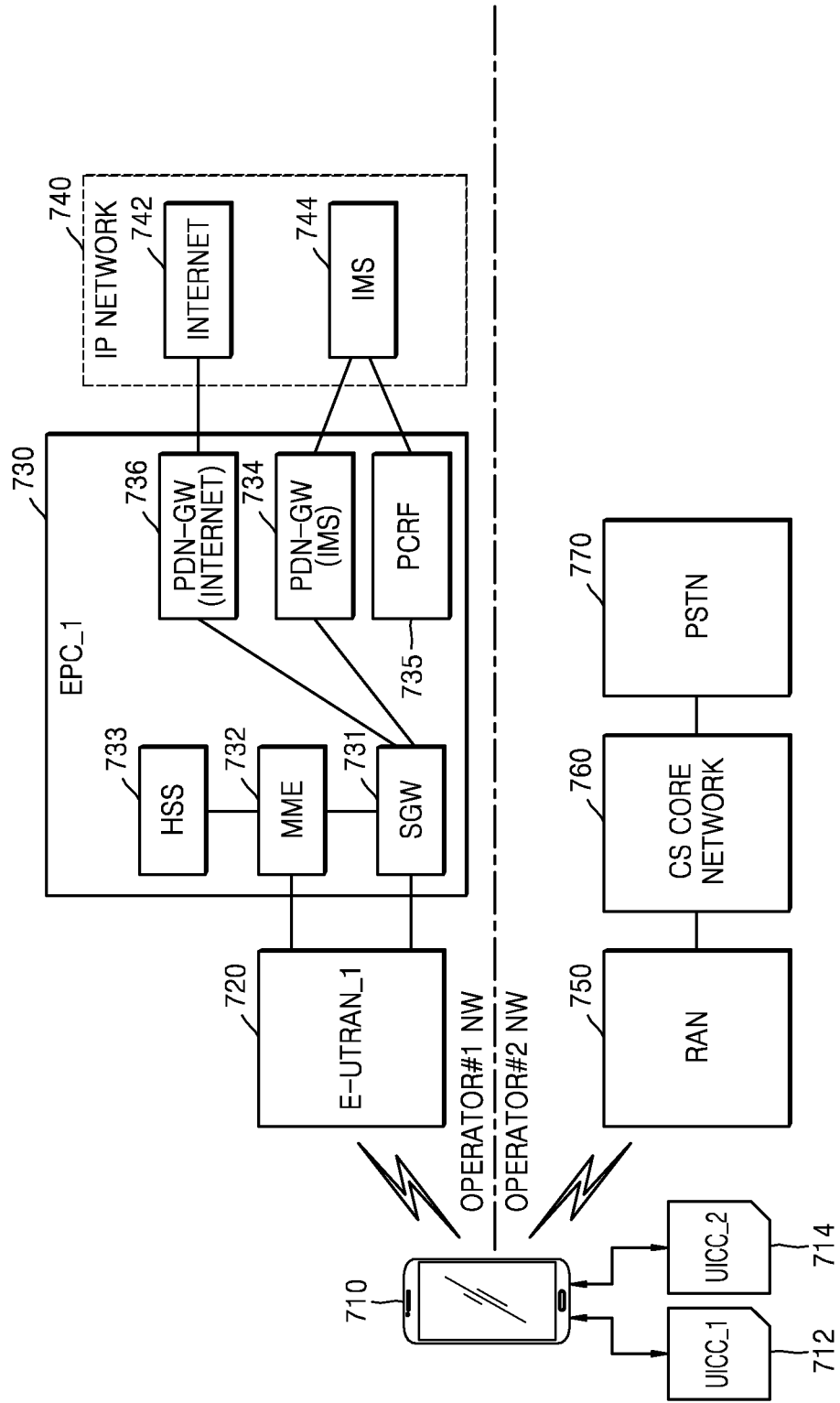
FIG. 15B is a block diagram illustrating an access operation of a wireless network of a wireless communication apparatus based on a result of the allocation operation of FIG. 15A.

FIG. 15A is a block diagram illustrating an allocation operation for a PS network according to another example embodiment of the inventive concepts, and FIG. 15B is a block diagram illustrating an access operation of a wireless network of a wireless communication apparatus 710 based on a result of the allocation operation of FIG. 15A.

In FIG. 15A, it is assumed that a SIM preferred when using a data service is a first SIM, a first operator corresponding to the first SIM is capable of providing a PS network, and a second operator corresponding to a second SIM is capable of providing a PS network and a CS network. An operation of a PDN allocator 715a of an application processor 715 after Operation S225 in FIG. 10 will be described with reference to FIG. 15A. For example, the operation of the PDN allocator 715a of the application processor 715 when performing operation S140 in FIG. 6 when the first SIM is used for accessing IMS packet data network and the second SIM is used for accessing only the CS network will be described below.

Referring to FIG. 15A, the wireless communication apparatus 710 may include the application processor 715 and access wireless network(s) by using a first protocol stack 716 and a second protocol stack 717. The first protocol stack 716 corresponding to a first SIM may include an LTE protocol stack 716a, and the second protocol stack 717 corresponding to a second SIM may include an LTE protocol stack 717a and a second generation/third generation protocol stack 717b. The PDN allocator 715a of the application processor 715 may allocate an Internet packet data network INT_PDN and an IMS packet data network IMS_PDN to the LTE protocol stack 716a of first protocol stack 716, based on first information Info_1 and second information Info_2. Furthermore, the PDN allocator 715a may configure the second protocol stack 717 to be used only when the second protocol stack 717 accesses a CS network.

Referring to FIG. 15B, a first operator network OPERATOR #1 NW which a first operator may provide to the wireless communication apparatus 710 based on a first SIM of a first UICC 712 may include an E-UTRAN 720 and an EPC 730. As a result of the allocation operation of the PDN allocator 722, the wireless communication apparatus 710 may access an Internet packet data network 742 through the first operator network OPERATOR #1 NW, by using the first protocol stack 716, when there is a data service request. The wireless communication apparatus 710 may access an IMS packet data network 744 through the first operator network OPERATOR #1 NW, by using the first protocol stack 716, when there is an IMS service request.

A second operator network OPERATOR #2 NW which a second operator may provide to the wireless communication apparatus 710 based on a second SIM of a second UICC 714 may include an RAN 750 and a CS core network 760. As a result of the allocation operation of the PDN allocator 715a, the wireless communication apparatus 710 may access a PSTN 770 through the second operator network OPERATOR #2 NW, by using the second protocol stack 717, when there is a CS-based voice service request. Detailed operations of the first UICC 712, the second UICC 714, an SGW 731, an MME 732, an HSS 733, and PDN-GWs 734 and 736 are the same as described above and thus are omitted below.

Figure 16A:
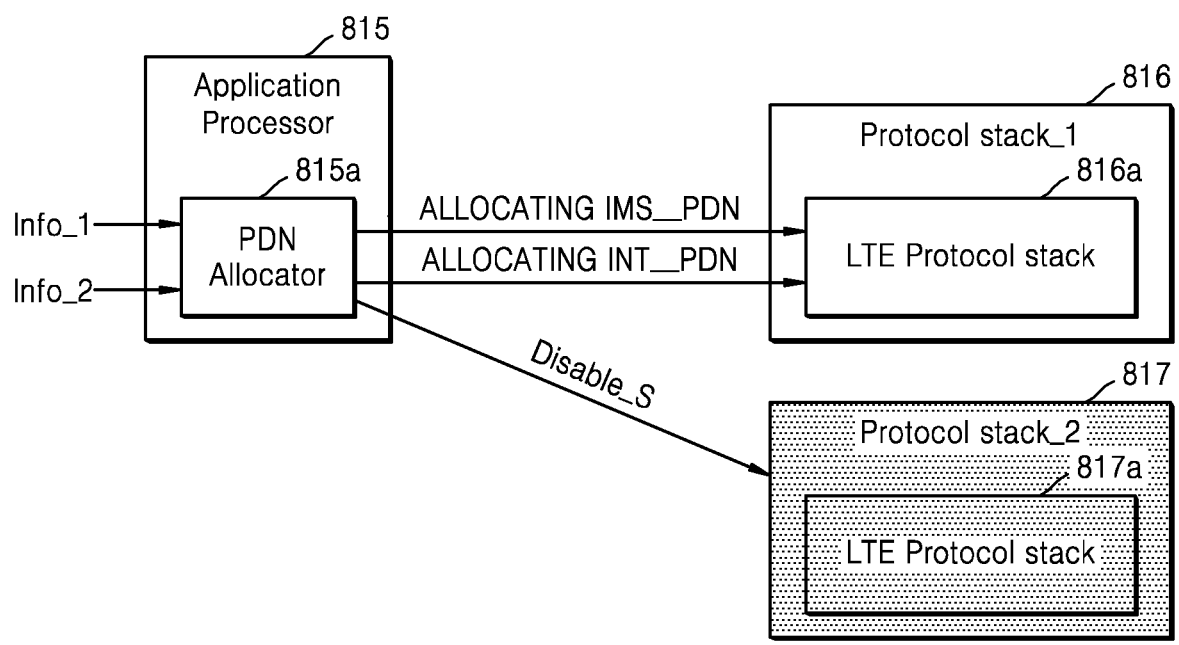
FIG. 16A is a block diagram illustrating an allocation operation for a PS network according to another example embodiment of the inventive concepts.
Figure 16B:
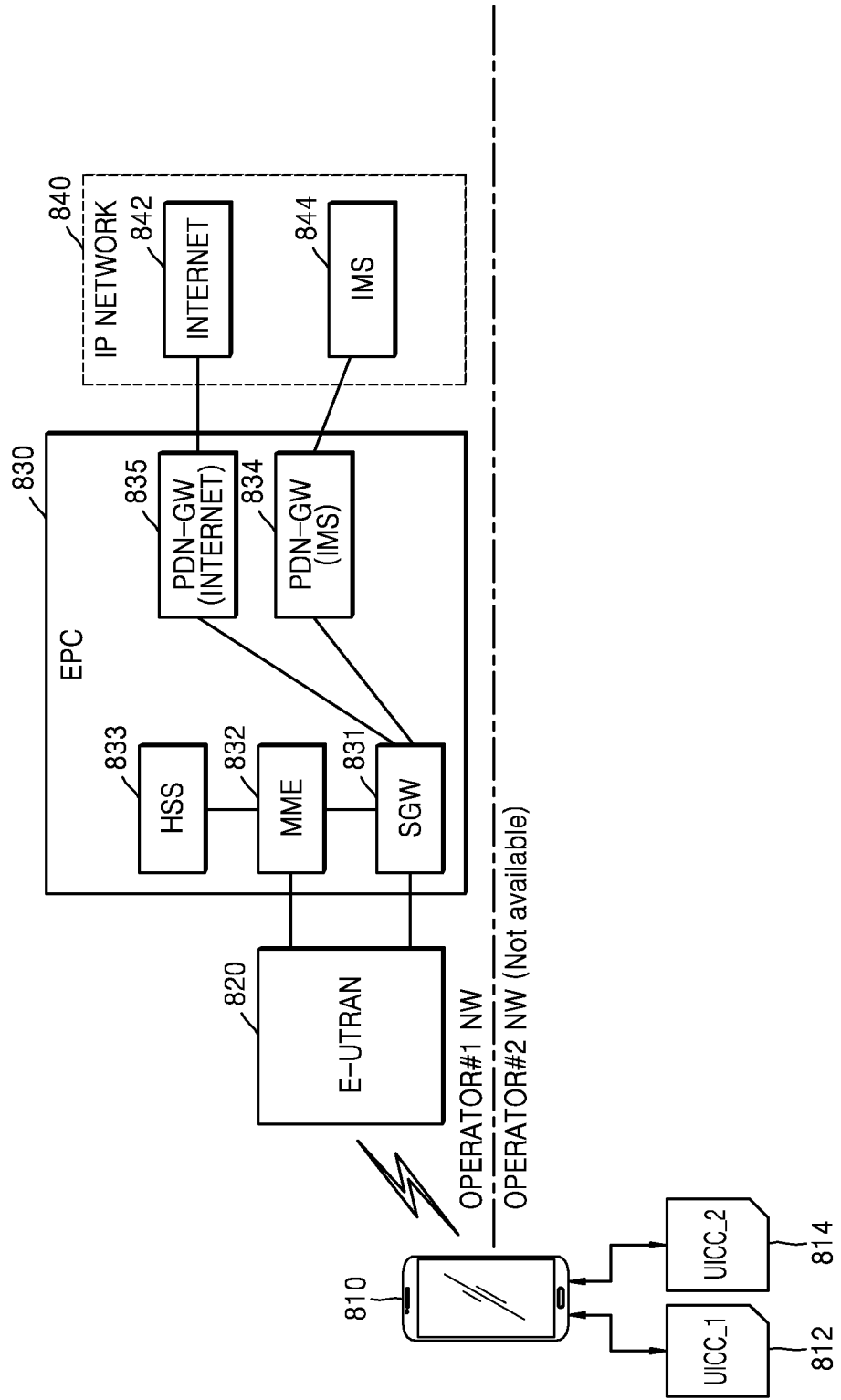
FIG. 16B is a block diagram illustrating an access operation of a wireless network of a wireless communication apparatus based on a result of the allocation operation of FIG. 16A.

FIG. 16A is a block diagram illustrating an allocation operation for a PS network according to another example embodiment of the inventive concepts, and FIG. 16B is a block diagram illustrating an access operation of a wireless network of a wireless communication apparatus 810 based on a result of the allocation operation of FIG. 16A.

In FIG. 16A, it is assumed that a SIM preferred when using a data service is a first SIM, a first operator corresponding to the first SIM is capable of providing a PS network, and a second operator corresponding to a second SIM is capable of providing a PS network. An operation of a PDN allocator 815a of an application processor 815 after Operation S232 in FIG. 12 will be described with reference to FIG. 16A. For example, the operation of the PDN allocator 815a of the application processor 815 when performing operation S140 in FIG. 6 when the second SIM is deactivated will be described below.

Referring to FIG. 16A, the wireless communication apparatus 810 may include the application processor 815. A first protocol stack 816 corresponding to a first SIM may include an LTE protocol stack 816a, and the second protocol stack 817 corresponding to a second SIM may include an LTE protocol stack 817a. The PDN allocator 815a of the application processor 815 may allocate an Internet packet data network INT_PDN and an IMS packet data network IMS_PDN to the LTE protocol stack 816a of the first protocol stack 816, based on first information Info_1 and second information Info_2. Furthermore, the PDN allocator 815a may provide a disable signal Disable_S to the second protocol stack 817 to deactivate the second protocol stack 817. The wireless communication apparatus 810 may access wireless network(s) by using only the first protocol stack 816.

Referring to FIG. 16B, a first operator network OPERATOR #1 NW which a first operator may provide to the wireless communication apparatus 810 based on a first SIM of a first UICC 812 may include an E-UTRAN 820 and an EPC 830. As a result of the allocation operation of the PDN allocator 815a, the wireless communication apparatus 810 may access an Internet packet data network 816a through the first operator network OPERATOR #1 NW, by using the first protocol stack 816, when there is a data service request. The wireless communication apparatus 810 may access an IMS packet data network 844 through the first operator network OPERATOR #1 NW, by using the first protocol stack 816, when there is an IMS service request.

A second operator network OPERATOR #2 NW which a second operator may provide to the wireless communication apparatus 810 based on a second SIM of a second UICC 814 may not be available because the second protocol stack 817 is deactivated. Accordingly, it is possible to prevent the second protocol stack 817 from unnecessarily using RF resources.

Figure 17A:
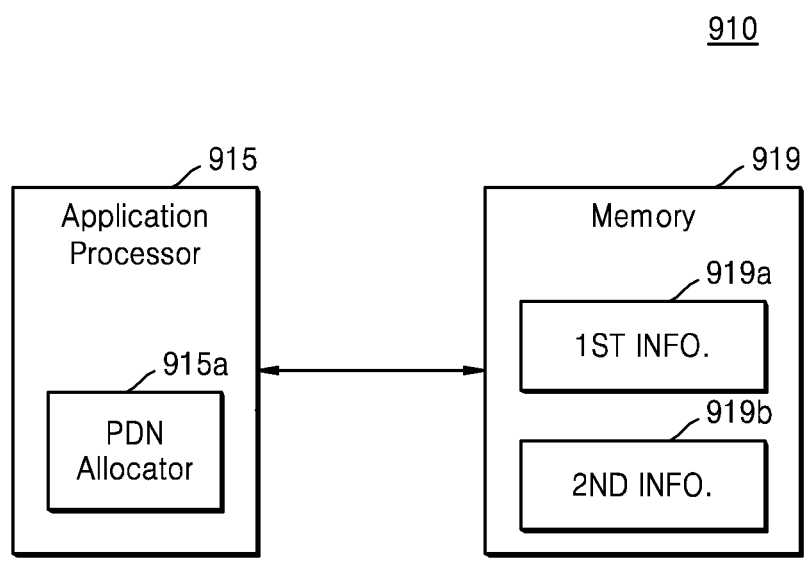
Figure 17B:
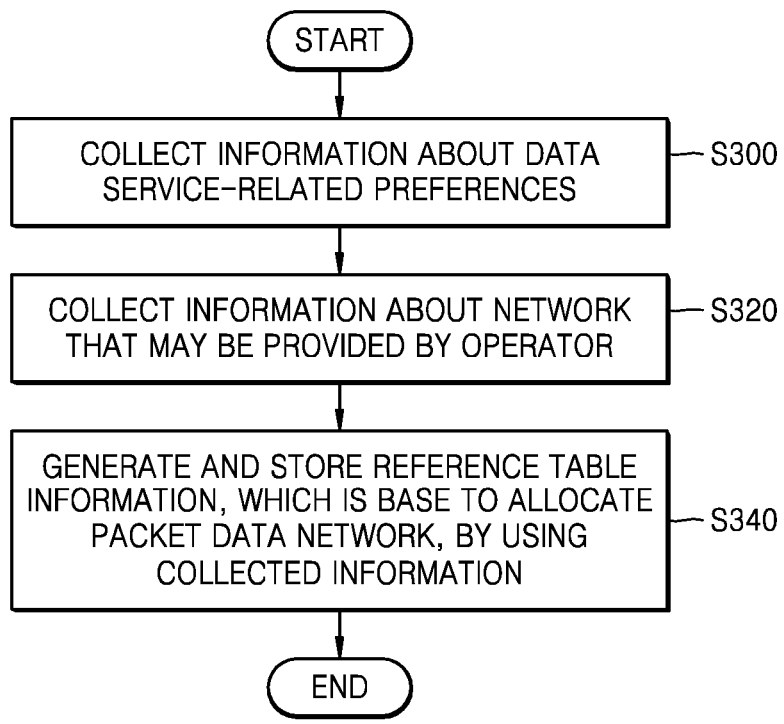

FIGS. 17A to 17C are diagrams illustrating information that used during a packet data network allocation operation according to an example embodiment of the inventive concepts is performed.

Referring to FIG. 17A, a wireless communication apparatus 910 may include the application processor 915 and a memory 919. The memory 919 may store first information 919a indicating data service-related preferences for SIMs included in the wireless communication apparatus 910 and second information 919b indicating a wireless network that may be provided by an operator corresponding to each of the SIMs. A PDN allocator 915a may read the first information 919a and the second information 919b from the memory 919 and perform an operation of allocating a packet data network as described above. This may correspond to an operation in which the application processor 915 selects a SIM for accessing any packet data network from among the SIMS. The first information 919a may be updated due to a change in data service-related preferences for the SIMs, and the second information 919b may be updated due to a change in the status of a wireless network that may be provided by an operator (e.g., when a wireless network is additionally established, or when an existing wireless network is dismantled). When at least one of the first information 919a and the second information 919b is updated, the PDN allocator 915a may perform an operation of re-allocating a packet data network, based on updated first or second information 919a or 919b.

With reference to FIGS. 17B and 17C, the operation of the application processor 915 for generating reference table information Ref Table is described. The PDN allocator 915a may perform an operation of allocating a packet data network by using the reference table information Ref Table.

Referring to FIG. 17B, in operation S300, the application processor 915 may collect information about data service-related preferences for the SIMs.

In operation S230, the application processor 915 may collect information about a network that may be provided by an operator corresponding to each of the SIMs.

In operation S340, the application processor 915 may generate reference table information Ref Table, which is used to allocate a packet data network, based on the collected information and store the generated reference table information Ref Table in the memory 919.

Referring to FIG. 17C, the application processor 915 may refer to data service-related preferences for first and second SIMs SIM1 and SIM2 to determine which SIM is a preferred SIM when a data service is used. Thereafter, the application processor 915 may determine whether a CS network is available through each of the first SIM SIM1 and the second SIM SIM2.

As a result, the application processor 915 may arrange SIMs related to a protocol stack, to which an Internet packet network INT PDN and an IMS packet network are allocated, to generate the reference table information Ref_Table and may store the generated reference table information Ref_Table in the memory 919.

The PDN allocator 915a may perform an operation of allocating a packet data network based on the reference table information Ref_Table. However, the reference table information Ref_Table shown in FIG. 17C is only an example embodiment and is not limited thereto, and may be generated using various references.

Figure 18:
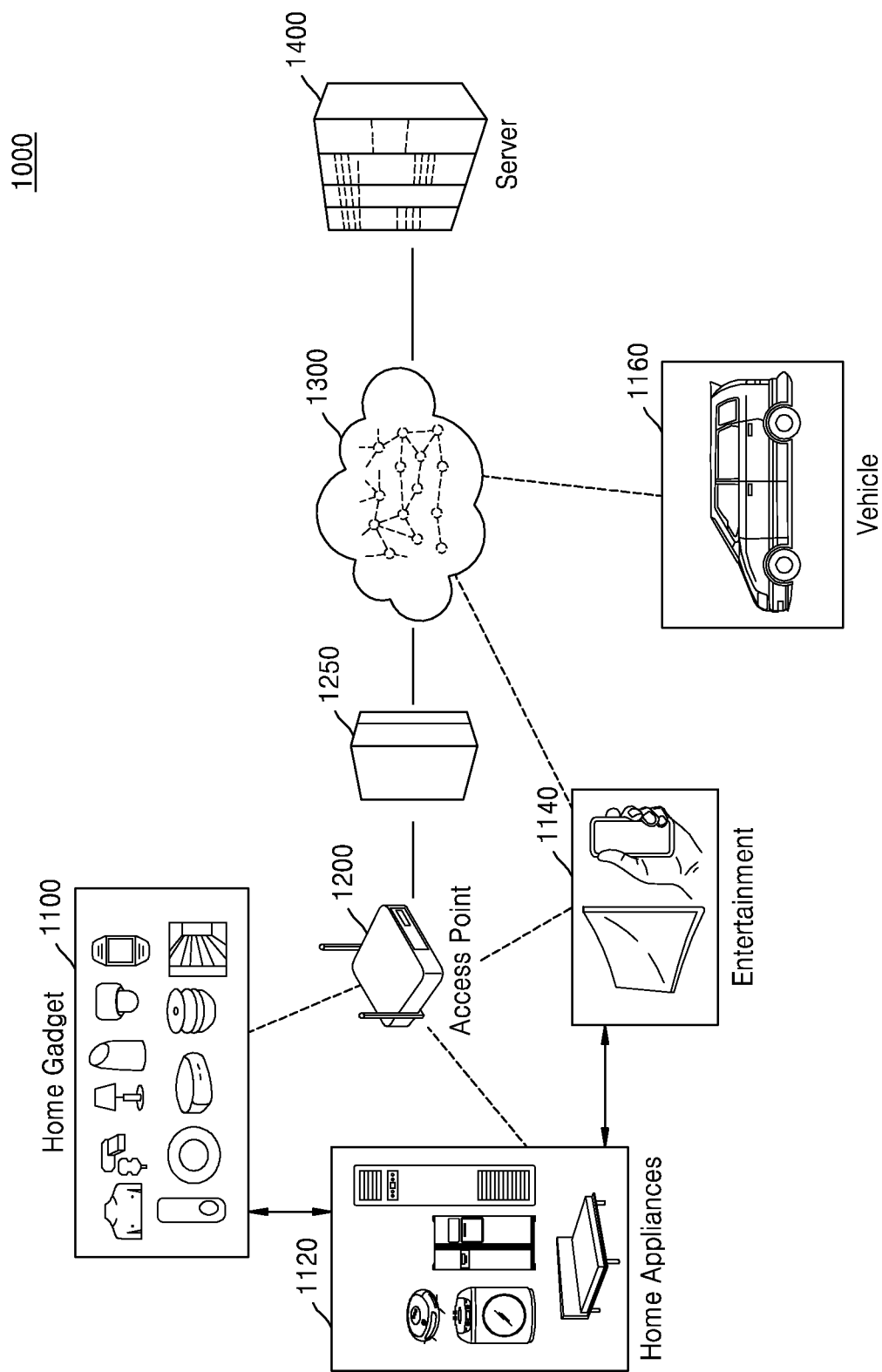
FIG. 18 is a conceptual diagram illustrating an Internet of Things (IoT) network system to which example embodiments of the inventive concepts are applied.

FIG. 18 is a conceptual diagram illustrating an Internet of Things (IoT) network system 1000 to which example embodiments of the inventive concepts may be applied.

Referring to FIG. 18, the IoT network system 1000 may include a plurality of IoT devices 1100, 1120, 1140, and 1160, an access point 1200, a gateway 1250, a wireless network 1300, and a server 1400. IoT may refer to a network of objects using wired/wireless communication.

Each of the IoT devices 1100, 1120, 1140, and 1160 may form a group according to characteristics of each IoT device. For example, the IoT devices 1100, 1120, 1140, and 1160 may be grouped into a home gadget group 1100, a home appliance/household group 1120, an entertainment group 1140, a vehicle group 1160, or the like. The plurality of IoT devices 1100, 1120, and 1140 may be connected to a communication network or other IoT devices through the access point 1200. The access point 1200 may be embedded in one IoT device. The gateway 1250 may change a protocol to connect the access point 1200 to an external communication network. The IoT devices 1100, 1120, and 1140 may be connected to the external communication network through the gateway 1250. The wireless network 1300 may include the Internet and/or a public network. The plurality of IoT devices 1100, 1120, 1140, and 1160 may be connected to the server 1400 that provides a desired (or, alternatively, a predetermined) service through the wireless network 1300, and a user may use a service through at least one of the plurality of IoT devices 1100, 1120, 1140, and 1160.

According to example embodiments of the inventive concepts, each of the plurality of IoT devices 1100, 1120, 1140, and 1160 may include a plurality of SIMs, and may perform an operation of selecting a SIM (or an operation of allocating a packet data network to a protocol stack) based on first information indicating data service-related preferences for SIMs and second information indicating a wireless network that may be provided by an operator corresponding to each of the SIMs, to access the server 1400 through the wireless network 1300.

While example embodiments of the inventive concepts have been particularly shown and described with reference to some example embodiments thereof, it will be understood that various changes in form and details may be made therein without departing from the spirit and scope of the following claims.

What is claimed is:

1. A method of managing access to a plurality of Packet Switched (PS) networks by a wireless communication apparatus, the plurality of PS networks including an Internet packet data network for providing a data service and an Internet protocol Multimedia Subsystem (IMS) packet data network for providing an IMS service, the wireless communication apparatus configured to operate using a plurality of Subscriber Identity Modules (SIMs), the method comprising:

obtaining first information indicating data service-related preferences for the plurality of SIMs;

selecting at least one SIM for accessing each of the plurality of PS networks from among the plurality of SIMs based on the first information and second information, the second information indicating a type of wireless network providable by operators corresponding to the plurality of SIMs, the selecting the at least one SIM including, selecting a preferred first SIM for accessing the Internet packet data network from among the plurality of SIMs based on the first information, the plurality of SIMs including the preferred first SIM and a second SIM, and determining whether to select the preferred first SIM for accessing the IMS packet data network based on the second information such that the data service-related preferences are selectively overridden and the second SIM rather than the preferred first SIM is selected for accessing the IMS packet data network based on whether at least one of the operators corresponding to the second SIM is not capable of providing a Circuit Switched (CS) network; and accessing the plurality of PS networks based on the at least one SIM.

2. The method of claim 1, wherein the determining whether to select the preferred first SIM for accessing the IMS packet data network further comprises:

determining whether a first operator is capable of providing the CS network based on first operator-related information included in the second information; and selecting the first preferred SIM for accessing the IMS packet data network, in response to the first operator not being capable of providing the CS network.

3. The method of claim 1, wherein the determining whether to select the preferred first SIM for accessing the IMS packet data network further comprises:

determining whether a first operator corresponding to the preferred first SIM is capable of providing the CS network based on the first operator-related information; and selecting the preferred first SIM or the second SIM for accessing the IMS packet data network based on second operator-related information corresponding to the second SIM, in response to the first operator being capable of providing the CS network, the second operator-related information being included in the second information.

4. The method of claim 3, wherein the selecting the preferred first SIM or the second SIM for accessing the IMS packet data network further comprises:
determining whether a second operator corresponding to the second SIM is capable of providing the CS network based on the second operator-related information; and
selecting the second SIM for accessing the IMS packet data network when the second operator is not capable of providing the CS network.

5. The method of claim 4, wherein the accessing the plurality of PS networks comprises:
accessing the Internet packet data network based on the preferred first SIM, in response to a request for the data service; and
accessing the IMS packet data network based on the second SIM, in response to a request for the IMS service.

6. The method of claim 3, wherein the selecting the preferred first SIM or the second SIM for accessing the IMS packet data network further comprises:
determining whether a second operator corresponding to the second SIM is capable of providing the CS network based on the second operator-related information; and
selecting the first preferred SIM for accessing the IMS packet data network when the second operator is capable of providing the CS network.

7. The method of claim 1, further comprising:
deactivating at least one of the plurality of SIMs based on the second information and a result of selecting the at least one selected SIM.

8. The method of claim 7, wherein the deactivating the at least one of the plurality of SIMs comprises:
determining which of a first operator corresponding to the first preferred SIM and a second operator corresponding to the second SIM is a non-selectable operator, the non-selectable operator being an operator that is both not selected for accessing the plurality of PS networks and is not capable of providing a Circuit Switched (CS) network; and
deactivating a SIM corresponding to the non-selectable operator.

9. The method of claim 7, wherein the wireless communication apparatus includes a display device, and wherein the method further comprises:
displaying, via the display device, information indicating that access to a wireless network including the plurality of PS networks and the CS network is not possible using the at least one of the plurality of SIMs that is deactivated.

10. The method of claim 1, wherein
the first information includes information indicating a SIM among the plurality of SIMs used to access an Internet packet data network for providing the data service, and the second information includes information about a type of network capable of being provided by the operators corresponding to each of the plurality of SIMs.

11. A wireless communication apparatus comprising:
a Subscriber Identity Module (SIM) interface configured to read data from a plurality of Subscriber Identity Modules (SIMs) including a first SIM and a second SIM, the first SIM and the second SIM each capable of supporting a data service and an Internet protocol Multimedia Subsystem (IMS) service; and
a processor coupled to the first SIM and the second SIM, the processor configured to,
store, in a memory, first information indicating data service-related preferences for the first SIM and second SIM in response to input from a user indicating which of the first SIM and second SIM is preferred for the data service,
obtain, from the memory, the first information indicating the data service-related preferences for the plurality of SIMs such that the first information indicates that the first SIM is preferred to support the data service,
allocate an Internet packet data network to one of a first protocol stack and a second protocol stack based on the first information, the first protocol stack corresponding to the first SIM and the second protocol stack corresponding to the second SIM, and
allocate an IMS packet data network to one of the first protocol stack and the second protocol stack based on second information indicating types of wireless networks providable by a first operator corresponding to the first SIM and a second operator corresponding to the second SIM such that, when the second information indicates that the first operator is capable of providing a Circuit Switched (CS) network and the second operator is not capable of providing the CS network, the processor is configured to override the data service-related preferences and allocate the IMS packet data network to the second protocol stack corresponding to the second SIM.

12. The wireless communication apparatus of claim 11, wherein, the processor is configured to,
allocate the Internet packet data network to the first protocol stack corresponding to the first SIM that is preferred to support the data service, and
access the Internet packet data network through the first protocol stack in response to a request for use of the data service.

13. The wireless communication apparatus of claim 12, wherein, when the second information indicates that the first operator is not capable of providing the CS network, the processor is configured to,
allocate the IMS packet data network to the first protocol stack corresponding to the first SIM, and
access the IMS packet data network through the first protocol stack using the first SIM in response to a request for use of the IMS service.

14. The wireless communication apparatus of claim 12, wherein, when the second information indicates that both the first operator and the second operator are capable of providing the CS network, the processor is configured to,
allocate the IMS packet data network to the first protocol stack corresponding to the first SIM that is preferred to support the data service from among the first SIM and the second SIM that are each capable of supporting the data service, and access the IMS packet data network through the first protocol stack using the first SIM in response to a request for use of the IMS service.

15. The wireless communication apparatus of claim 14, wherein the processor is configured to set the second SIM to support only the CS network.

16. The wireless communication apparatus of claim 11, wherein the second information indicates a wireless network capable of being provided by other operators other than the first operator and the second operator.

17. A non-transitory computer-readable recording medium storing therein instructions executable by a processor of a wireless communication apparatus, the wireless communication apparatus configured to operate using a plurality of Subscriber Identity Modules (SIMs) and a transceiver to,
 store, in a memory, first information indicating data service-related preferences for the plurality of SIMs in response to input from a user indicating which of plurality of SIMs is preferred for a data service;
 obtain, from the memory, the first information indicating the data service-related preferences for the plurality of SIMs;
 select at least one SIM for accessing a plurality of PS networks from among the plurality of SIMs based on the first information and second information, the second information indicating a type of wireless network providable by operators corresponding to the plurality of SIMs, the wireless communication apparatus configured to select the at least one SIM for accessing the plurality of PS networks by,
 selecting a preferred first SIM for accessing an Internet packet data network from among the plurality of SIMs based on the first information, the plurality of SIMs including the preferred first SIM and a second SIM, and
 determining whether to select the preferred first SIM for accessing an Internet protocol Multimedia Subsystem (IMS) packet data network based on the second information such that the data service-related preferences are selectively overridden and the second SIM rather than the preferred first SIM is selected for accessing the IMS packet data network based on whether at least one of the operators corresponding to the second SIM is not capable of providing a Circuit Switched (CS) network; and
 access, via the transceiver, the plurality of PS networks based on the at least one SIM.

* * * * *